US011394604B2

(12) United States Patent
Rayes et al.

(10) Patent No.: US 11,394,604 B2
(45) Date of Patent: Jul. 19, 2022

(54) CLOSED-LOOP AUTOMATION OF A MANAGED NETWORK

(71) Applicant: Cisco Technology, Inc., San Jose, CA (US)

(72) Inventors: Ammar Rayes, San Ramon, CA (US); Arun Mammen Thomas, Dublin, CA (US); Samer Salam, Beirut (LB); Michael Michaelides, San Jose, CA (US); Arabinda Samantaray, San Jose, CA (US); Madhavan Kasthurirangan, Palo Alto, CA (US); Ram Prasanna Govind Krishnan, Sunnyvale, CA (US); Asad Ghayas Ahmed, Palo Alto, CA (US); Thuan Quang Truong, Milpitas, CA (US); Ajay Madhavan, Milpitas, CA (US); Xixi Luo, San Jose, CA (US); Samhith Venkatesh, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/017,390

(22) Filed: Sep. 10, 2020

(65) Prior Publication Data

US 2022/0078072 A1 Mar. 10, 2022

(51) Int. Cl.
*H04L 12/00* (2006.01)
*H04L 41/0654* (2022.01)
(Continued)

(52) U.S. Cl.
CPC ...... *H04L 41/0672* (2013.01); *H04L 41/0677* (2013.01); *H04L 41/0686* (2013.01); *H04L 41/0813* (2013.01)

(58) Field of Classification Search
CPC ............ H04L 41/0672; H04L 41/0686; H04L 41/0677; H04L 41/0813; H04L 41/0883
(Continued)

(56) References Cited

U.S. PATENT DOCUMENTS

| | | | |
|---|---|---|---|
| 8,620,909 | B1 | 12/2013 | Rennison |
| 2004/0249779 | A1 | 12/2004 | Nauck et al. |

(Continued)

FOREIGN PATENT DOCUMENTS

WO WO-2020046372 A1 * 3/2020 ......... G05B 23/0283

OTHER PUBLICATIONS

Ijntema et al., "A Lexico-Semantic Pattern Language for Learning Ontology Instances From Text," Elsevier, Jan. 26, 2012, pp. 1-22.

*Primary Examiner* — Frantz Coby
(74) *Attorney, Agent, or Firm* — Polsinelli PC

(57) ABSTRACT

The present technology addresses a need in the art for a closed-loop automation system of a managed network that detects and fixes an issue in the managed network with minimal to no human intervention. The closed-loop automation system employs a domain-independent semantic machine reasoning engine as an underlying engine. After detecting the issue in the managed network, the system searches through a knowledge base to find a match for the detected issue. The knowledge base includes previously collected knowledge from subject matter experts and maintenance teams. The system then proposes a remedial action to a user of the managed network for approval. After approval by the user, the system implements the remedial action.

20 Claims, 20 Drawing Sheets

(51) Int. Cl.

| | |
|---|---|
| ***H04L 41/0813*** | (2022.01) |
| ***H04L 41/0686*** | (2022.01) |
| ***H04L 41/0677*** | (2022.01) |

(58) Field of Classification Search

USPC .......................................................... 709/224

See application file for complete search history.

(56) References Cited

U.S. PATENT DOCUMENTS

| | | | | |
|---|---|---|---|---|
| 2014/0133314 | A1* | 5/2014 | Matthews | H04L 41/0672 370/244 |
| 2016/0267384 | A1 | 9/2016 | Salam et al. | |
| 2017/0366391 | A1* | 12/2017 | Crowns | H04L 41/12 |
| 2018/0165604 | A1 | 6/2018 | Minkin et al. | |
| 2020/0204452 | A1* | 6/2020 | Bhat | H04L 41/0883 |

* cited by examiner

```
<?xml version="1.0"?>
<rdf:RDF xmlns="http://www.cisco.com/CNSR/ISIS#"
xml:base="http://www.cisco.com/CNSR/ISIS"
...>
<owl:Ontology rdf:about="http://www.cisco.com/CNSR/ISIS"/>
```

Relationships 302

```
<!--    // Object Properties    // -->
<owl:ObjectProperty rdf:about="http://www.cisco.com/CNSR/XDEPAL/assuranceDNA/shClnsNeighbors#hasclnsneighbors"/>
...
<!-- // Data properties // -->
<owl:DatatypeProperty rdf:about="http://www.cisco.com/CNSR/XDEPAL/assuranceDNA/shClnsNeighbors#dtpsystem"/>
...
```

Concepts 304

```
<!--    // Classes //    -->
<owl:Class rdf:about="http://www.cisco.com/CNSR/XDEPAL/assuranceDNA/shClnsNeighbors#result"/>
...
```

Rules 306

```
<!--    // Rules //    -->
<rdf:Description>
<rdfs:label rdf:datatype="http://www.w3.org/2001/XMLSchema#string">cnsr_rule_1</rdfs:label>
<rdf:type rdf:resource="http://www.w3.org/2003/11/swrl#Imp"/>
<swrl:body>
 <rdf:Description>
<rdf:type rdf:resource="http://www.w3.org/2003/11/swrl#AtomList"/>
<rdf:first>
<rdf:Description>
<rdf:type rdf:resource="http://www.w3.org/2003/11/swrl#DatavaluedPropertyAtom"/>
<swrl:propertyPredicate rdf:resource="http://www.cisco.com/CNSR#context"/>
<swrl:argument1 rdf:resource="http://www.cisco.com/CNSR/ISIS#var2"/>
<swrl:argument2 rdf:datatype="http://www.w3.org/2001/XMLSchema#string">
TroubleshootISIS::1::assuranceDNA.shClnsNeighbors::0::0::0</swrl:argument2>
</rdf:Description>
</rdf:first>
<rdf:rest>
<rdf:Description>
<rdf:type rdf:resource="http://www.w3.org/2003/11/swrl#AtomList"/>
<rdf:first>
...
```

CLOSED-LOOP AUTOMATION OF A MANAGED NETWORK

TECHNICAL FIELD

The present technology pertains to closed-loop automation of a managed network and, more particularly, to automated processes of detecting and fixing an issue in the managed network with minimal to no human intervention using a semantic machine reasoning engine.

BACKGROUND

With increasing complexity in networks and associated management applications, it is becoming commonplace for networks to be too complex for their administrators to be able to effectively troubleshoot. There are some tools that assist administrators, but these have limitations. Commonly practiced tools use inflexible data templates to automate provisioning within and between data centers as well as secure networks. Only subject matter experts who have profound network knowledge can change or modify the data templates.

Running different configurations against the network can be a time-consuming task. The complexity of the network and number of configurations may significantly prolong this task. In addition, the users may not have in-depth knowledge of working with networks. Furthermore, the users may not be comfortable with writing codes and scripts for running every configuration they would like to run. Even requiring the users to write minimal code and script is not something that the users favor.

BRIEF DESCRIPTION OF THE FIGURES

To provide a more complete understanding of the present disclosure and features and advantages thereof, reference is made to the following description, taken in conjunction with the accompanying drawings, in which:

FIG. 3 illustrates an example embodiment of a web ontology language (OWL) file, interpretable by a semantic machine reasoning engine, in accordance with some aspects of the present technology;

DETAILED DESCRIPTION OF EXAMPLE EMBODIMENTS

Figure 1:
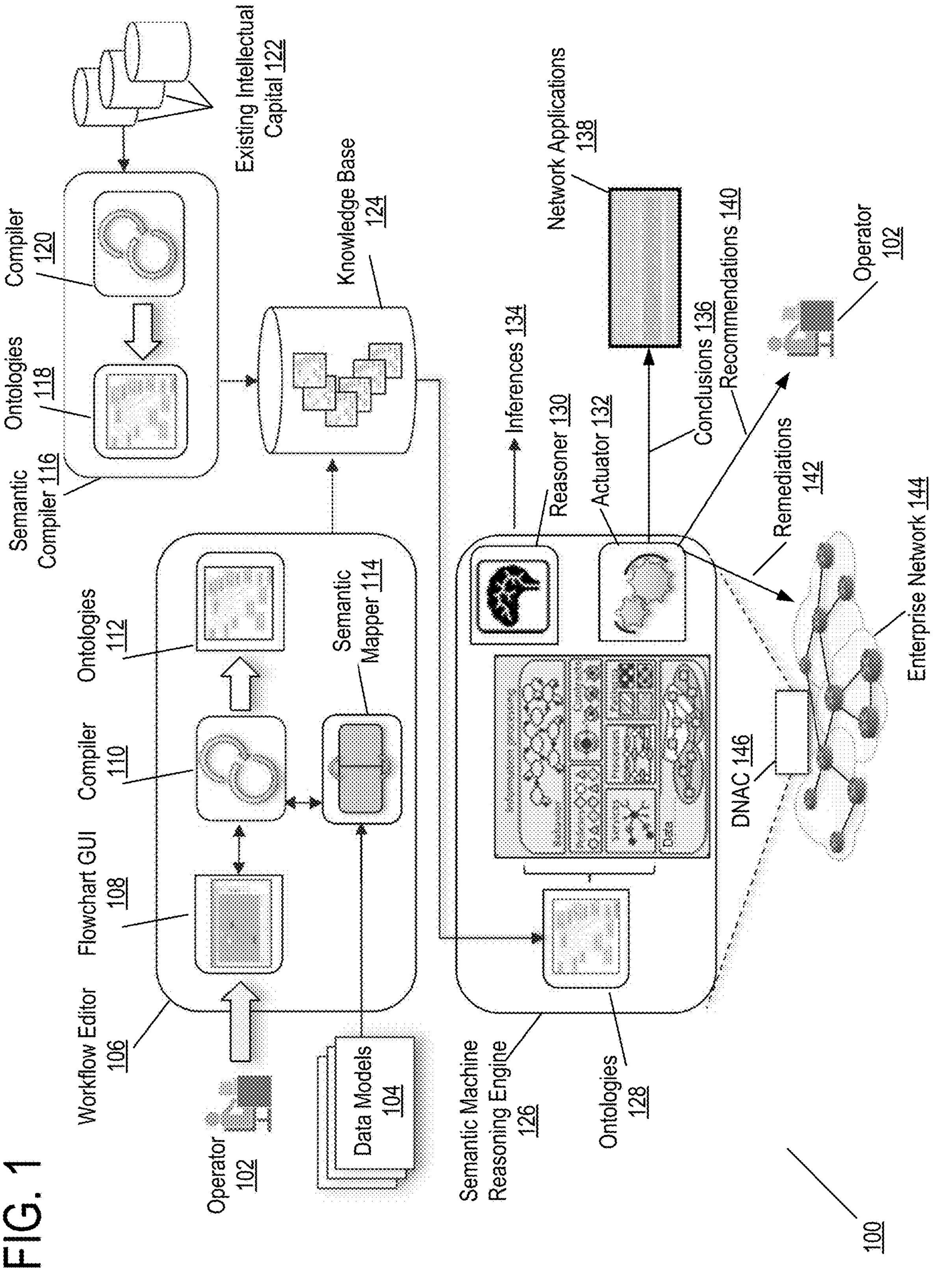
FIG. 1 illustrates an example embodiment of an architecture of a semantic machine reasoning engine, in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present technology can include a method for closed-loop automation of detecting an issue and fixing the issue in a managed network environment with minimal to no human intervention. In accordance with various aspects of the subject technology, the method includes detecting at least one network event that correlates with a diagnostic signature. The diagnostic signature defines a possible network condition that is indicated by the presence of the at least one network event. Afterwards, the method initiates a semantic machine reasoning workflow based on the diagnostic signature to identify a root cause of the at least one network event. The method further includes triggering a remediation of the identified root cause.

In accordance with various aspects of the subject technology, the diagnostic signature is linked to the workflow. Further, the semantic machine reasoning workflow is characterized by a series of machine reasoning cycles that include a collection of facts. The method further includes performing machine reasoning based on the collection of facts and performing an action based on an output of the machine reasoning. In some embodiments, the action can include propagating knowledge to a subsequent cycle in the series of machine reasoning cycles or the remediation.

In accordance with various aspects of the subject technology, within a machine reasoning cycle from the series of machine reasoning cycles, the method conducts the machine reasoning cycle in a plurality of subcycles. Each subcycle performs actions defined by the machine reasoning cycle on a subset of the available facts. The method further includes storing a preliminary deduction in memory and purging unnecessary available facts.

In accordance with various aspects of the subject technology, the semantic machine reasoning workflow is represented in one or more ontology web language (OWL) files that includes rules for carrying out the semantic machine reasoning workflow. Further, the one or more OWL files are compiled from structured data defining at least a condition, a root cause determination logic, and an action. In some embodiments, the root cause determination logic defines rules for carrying out at least a portion of the semantic machine reasoning workflow.

DETAILED DESCRIPTION

In accordance with various aspects of the subject technology, a system and an accessible interface are disclosed that allow users to build custom workflows and flowcharts for their networks without knowing the specifics of their device(s), particular device outputs and/or protocols, or how to parse the outputs of the device.

A user can create a network-based workflow for carrying out a network task in a workflow editor user interface. As an example, the user may be interested to examine how adding a new access point to a wireless network can extend the bandwidth of the wireless network or impact the wireless network from a security perspective. In some embodiments, the workflow created by the user may include arranged representations of workflow entities including representation of input data, intents, processes, and queries in a tree graph.

In accordance with various aspects of the subject technology, the workflow editor user interface provides the user with the possibility of creating the workflow through selecting blocks and interconnections for connecting the blocks to perform the network task. The user does not need to have profound knowledge or experience of working with networks. In some embodiments, the user does not need to know coding or scripting to be able to work with the workflow editor user interface. The user drags and drops network commands, which are represented in the form of blocks, and fits them together to create the workflow. Thanks to the drag-and-drop graphical interface of the workflow editor user interface, the user can create the workflow without writing any code or script. In addition to the blocks and the interconnections, the workflow editor user interface can include different windows, icons, menus, and pointers that facilitates working with the workflow editor user interface further for the user.

After creating the workflow by the user in the workflow editor user interface, a compiler compiles the workflow. The compiler may take a human-readable construction of the workflow as an input, and outputs a corresponding ontology. The ontology can be processed and executed by a semantic machine reasoning engine in a controller managed network, for example CISCO TECHNOLOGIES enterprise network controller DNAC (DIGITAL NETWORK ARCHITECTURE CENTER) environment.

Support engineers and service teams can capture their intellectual capital related to network operations by documenting the intellectual capital in the human-readable construction. This construction may be in the form of a spreadsheet, an extensible markup language (XML) file, a JavaScript object notation (JSON) file, a plain text file, or any other file format that is able to formalize and capture the intellectual capital in a structured manner.

If the human-readable construction uses a unique structure (e.g. semantics), then it is necessary for a developer to analyze the semantics and construct the compiler that corresponds to this particular semantic construct. However, once the compiler is developed for a semantic construct, additions of intellectual capital to the human-readable construction utilizing the same semantic construct may be compiled automatically.

The intellectual capital relates to network operations. Several types of information may be included in the human-readable construction. In some embodiments, the human-readable construction may specify key conditions. The key conditions are conditions that an operator or a support engineer needs to pay attention to.

In some embodiments, the construction may specify additional data collection. If conditions are met, the additional data to be collected can be identified in a structured and rules-based manner.

In some embodiments, the human-readable construction may specify root cause determination. Different types of analysis may be performed on the additional data to build more contextual awareness. Based on the conducted analysis, a set of conclusions or inferences can be constructed to identify the root cause of a problem.

In some embodiments, the construction may specify a remedial action. The remedial action corresponds to the determined root cause of the problem that can also be included in the construction.

The human-readable construction summarizing this information is structured in a predetermined manner. For example, a construction in the form of a spreadsheet may have each type of information listed in a separate column. The corresponding compiler is able to then interpret the human-readable construction to generate a formal semantic model (e.g. ontology) that is interpretable by a machine reasoning system (e.g. the semantic machine reasoning engine). The goal of this compilation step is to generate the ontology that will drive the semantic machine reasoning engine to carry out the same steps that a human would when following the instructions of the corresponding human-readable construction of the network workflow.

The ontology may be in any language interpretable by the semantic machine reasoning engine. As an example, the compiler may generate ontologies in the World Wide Web consortium (W3C) standard language, semantic web rule language (SWRL), which is based on a combination of the web ontology language (OWL) description logic (DL) and OWL Lite sublanguages of the web ontology language (OWL).

The compiler generates the ontology by defining concepts, relationships between concepts, variable definitions (e.g., strings to match, thresholds to use, values to compare, etc.), and the rules that define the workflow.

Each rule consists of a set of conditions to be met, as well as a conclusion that is carried out when conditions are met. For example, there may be a rule specifying a threshold for CPU usage, and the rule triggers certain defined actions to be taken once the threshold is surpassed. The conclusion of the rule specifies the actions that should be taken once the conditions are satisfied. The conclusion may specify which types of additional data need to be collected, as well as any types of analysis that should be performed on the collected data. The analysis may include arithmetic checks, logical checks, string manipulation etc. on the collected data. Based on the aforementioned analysis, the semantic machine reasoning engine reaches a determination for the root cause of the problem. Once the root cause is found, another set of rules may be triggered to execute a corresponding remedial action.

The generated ontology is structured to capture workflows and outline the steps that a human would have taken. Each workflow is also associated with a uniform resource identifier (URI) that uniquely identifies the workflow. When the ontology is loaded into the semantic machine reasoning engine, the semantic machine reasoning engine identifies the workflow using its URI, and executes the workflow. Ontologies may also be composed such that one ontology consists of a workflow that calls and executes another ontology.

The compiled ontology may be uploaded to a cloud-based knowledge base repository. Users can be tethered back to this knowledge base repository and have access to the hosted ontologies. In some examples, certain ontologies have entitlement and licensing capabilities for access control.

An example implementation of the disclosed compiler may be a security advisory system used to automate the detection of security vulnerabilities. In this example, the human-readable construction may be a JavaScript object notation (JSON) object that specifies which conditions need to be met in order to declare a particular device to be vulnerable to a particular security issue. The compiler that corresponds to the JSON file is then able to translate the JSON file into an ontology that can run on a reasoning engine. This ontology is then executed on a network, and is able declare which devices in the network are susceptible to the security issues.

After completing the compilation, the compiler creates a web ontology language (OWL) file. Web ontology language (OWL) is an industry-standard language that can be interpreted by the semantic machine reasoning engine. An ontology formally represents knowledge as a hierarchy of concepts within a domain (e.g., a network), using a shared vocabulary to denote types, properties, and interrelationships of the concepts.

To create the OWL file, the compiler identifies inferences. In some embodiments, the inferences can be conclusions. Then, the compiler traverses upwards through the tree graph within a reasoning cycle bound. In some embodiments, distinct reasoning cycle bounds are separated using alternating gray and white backgrounds in the workflow editor user interface for ease of interpretability.

After the compilation is completed, the system proceeds to a certification process. In some embodiments, the certification process includes automated tests to evaluate the performance impact of the workflow on the network. In accordance with various aspects of the subject technology, the certification process includes an assessment of the performance impact of the workflow created by the user on the network. In some embodiments, the performance impact of the workflow on the network can be evaluated in the form of either small (S), medium (M), large (L), or extra-large (XL). After evaluating the performance impact of the workflow on the network, the performance impact can be communicated to the user.

Depending upon evaluation of the performance impact, it is determined that if the workflow can be executed on a periodic basis or if the workflow should be triggered by the user. If the impact of the workflow on the network is assessed to be small (S), for example, it is an indication that the workflow can be executed on a periodic basis. Stated differently, because the performance impact has been evaluated to be small, running the workflow periodically does not significantly hamper the functionality of the network. However, if the impact of the workflow on the network is assessed to be extra-large (XL), for example, it is a sign that the workflow should be triggered by the user and not run on a periodic basis. In other words, to avoid thwarting the operation of the network, triggering the workflow is delegated to the user.

In accordance with various aspects of the subject technology, the system may use a knowledge base for determining the performance of the workflow on the network. The knowledge base can act as a repository for storing ontologies. The ontologies stored in the knowledge base have been generated based on technology expertise, workflows and algorithms, best practices and validated designs, and business rules and policies. In some embodiments, the ontologies stored in the knowledge base can also represent any pertinent network data with respect to issues faced in configuration and operation of networks and corresponding solutions for the issues, collected throughout years, and essentially any information thought to be useful in handling different network devices and configurations. Users of the workflow editor user interface can contribute to enriching the knowledge base by letting the system use workflows created by the users.

In accordance with various aspects of the subject technology, the user can view different workflows and read respective descriptions of different use cases of workflows provided in the workflow editor user interface. It is to be noted that the workflow may show up globally for all the users of the workflow editor. In some embodiments, however, the workflow may also be set to be visible only to certain users. Based on the assessment and the performance impact of the workflow on the network, the user may decide whether to include the workflow in the network. For example, the user may decide whether to add the workflows in a network controller environment.

After the creation of the workflow by the user, all paths navigating through the workflow should be tested. This testing process can ensure the decisions and outputs of the workflow correspond to the knowledge that the user intended to convey with the workflow. To proceed with the testing process, mock data is needed. An automated mock data engine generates the mock data for traversal through each of the workflow's paths.

As an example, the user can make a simple two-tiered decision tree where upper paths indicate equality with a value at a decision point, and lower paths indicate inequality with a value at a decision point. In order to ensure the veracity of the workflow, the testing procedure tests all paths, not all outputs.

The automated mock data engine creates data to traverse this set of all paths. To do this, the automated mock data engine traverses the workflow in retrograde, from outputs to inputs. This is done for each output. As the automated mock data engine climbs through the workflow, the automated mock data engine creates a list of data values that reach the output it started from.

A testing engine then uses the mock data produced by the automated mock data engine to ensure that each input corresponds to the appropriate output by simply feeding each input into the workflow and measuring the output. The process of validating that inputs and outputs correspond can be done by the user or can be done automatically. If the process of validating done automatically, external validation can be used, such as a table of corresponding inputs and outputs. Without an external source of validation, the workflow can be internally consistent but may not correspond to the reasoning of the user.

After the process of validation is completed, the system can pass on the workflow to the semantic machine reasoning engine for use.

According to some embodiments, a debugging functionality can also be included that allows the user to set breakpoints throughout the workflow. The user is able to step through the workflow, stop the process at each breakpoint, and review the value of variables at that point in the workflow and/or related processes or sub-processes.

According to some embodiments, additional functionalities may include, for example, a closed loop solution system. Once an issue and a fix have been identified by the reasoner, the closed loop solution system proposes issues and fixes, receives user approval regarding the issues, and fixes the issues. As a result, network functionality can be maintained during issue occurrence without requiring the user to write code.

Another example extension is the ability to automatically detect a need for additional information in the workflow. This extension issues additional commands to gather additional information to help identify the root causes of a problem. Alternatively, this extension alerts the user and provides the user with an option to create a custom solution to gather additional information.

In accordance with some embodiments of the subject technology, the workflow can automatically translate intellectual capital into ontologies via the compiler. In some embodiments, intellectual capital can represent any pertinent network expert knowledge with respect to issues faced in configuration and operation of networks and corresponding solutions for the issues, collected throughout years, and essentially any information thought to be useful in handling different network devices and configurations. According to some embodiments, intellectual capital can represent sets of rules created by Cisco engineers.

In accordance with some embodiments of the subject technology, one of the benefits of this disclosure over the other workflows is the use of the semantic machine reasoning engine, which allows the accumulation of centralized knowledge. The semantic machine reasoning engine provides a declarative programming paradigm known as logic programming, which is based on first order logic formalisms. A program in this paradigm is a set of sentences or axioms in logical form, expressing facts and rules about the problem domain.

The rules can be written in any order, and the semantic machine reasoning engine decides on the correct order of execution of the rules. In accordance with some embodiments, the semantic machine reasoning engine determines any interdependencies amongst the rules.

In some embodiments, the semantic machine reasoning engine also handles any rule chaining automatically. Rule chaining refers to a scenario where the outcome or conclusion of one rule affects the input conditions for another one or more rules.

In accordance with some embodiments of the subject technology, the semantic machine reasoning engine also offers separation of logic and data. The data is defined in the data model objects, as defined in device data extraction. The logic, however, is centralized in declarative rules. This provides the advantage of making the logic easier to maintain, especially when the said logic is a cross logic or a multi-domain logic. In some embodiments, examples of multi-domain logic can include technology axioms, business rules, hardware restrictions, software release restrictions, or variations. The logic is organized in distinct rule files instead of being intertwined with or spread across, many domain objects.

In light of the above, the semantic machine reasoning engine naturally enables the centralization of knowledge. The rule files constitute a knowledge base of intellectual capital that can be curated over time. This knowledge base can be version controlled and acts as a single point of truth for domain know-how.

In some embodiments, the semantic machine reasoning engine provides advantages in terms of maintenance and extensibility. Each rule represents an atomic piece of logic that can be maintained independently. It is not required to understand the whole set of rules in order to make an update to a single rule. Rules also lend themselves to higher-level abstractions and graphical visualizations that completely mask the underlying technology and make the knowledge capture process easy for non-coding domain experts. The non-coding domain experts can include users, customers, engineers of the technical assistance center, and essentially anyone who does not necessarily have profound coding knowledge.

The semantic machine reasoning engine adopts the open world assumption (OWA). This codifies the notion that complete knowledge is not known a priori and may or may not be added in the future. OWA is particularly advantageous in distributed systems, such as networks, since no single node is guaranteed to have a complete and up-to-date view of all the nodes.

In addition, the workflow automatically translates intellectual capital (typically sets of rules created by CX engineers) into ontologies via the compiler. Again, no new code is required.

FIG. 1 illustrates an example architecture 100 of a semantic machine reasoning engine, in accordance with various aspects of the subject technology. The semantic machine reasoning engine is a network automation engine that uses artificial intelligence (AI) to automate complex network operation workflows. The semantic machine reasoning engine encapsulates human knowledge and expertise into a fully automated inference engine to help users perform complex root cause analysis, detect issues and vulnerabilities, and either manually or automatically perform corrective actions.

Operator 102 represents people in third party entities including, but not limited to, customers and partners, who are provided with access to workflow editor 106. In some embodiments, operator 102 can use flowchart GUI 108 to create network-based workflows to be run by the semantic machine reasoning engine.

Operator 102 can also represent engineers, experts, and technical staff, in different teams such as technical assistant center (TAC), advanced services (AS), etc. If operator 102 has in-depth knowledge of working with flowchart GUI 108 and is authorized to do so, then operator 102 can contribute in flowchart GUI 108 by defining hardware capabilities of devices that can be used in flowchart GUI 108 and outlining software constraints associated with the devices. Further, if operator 102 has in-depth knowledge of working with flowchart GUI 108 and is authorized to do so, then operator 102 can manage protocols and feature axioms, conduct troubleshooting and debugging of workflows in flowchart GUI 108, and essentially all tasks pertinent to technical aspects of creating and maintaining the functionality of flowchart GUI 108 and automaticity of workflows in flowchart GUI 108.

Through using flowchart GUI 108 and various blocks and interconnections provided within flowchart GUI 108, operator 102 who does not necessarily have in-depth knowledge of working with flowchart GUI 108 can create his own workflows and perform deployment-specific customizations in his created workflows.

Data models 104 provide a programmatic and standard-based way of writing configurations to any network device. Data models 104 replace traditional ways of managing network devices that use command-line interfaces (CLIs) for configurational (configuration commands) and operational data (show commands). In addition, data models 104 have advantages over simple network management protocol (SNMP), which is widely used for network management. Data models 104 are developed in a standard and industry-defined language, which can define configuration and state information of a network.

Data models 104 are sent to semantic mapper 114. Semantic mapper 114 is in communication with compiler 110. Flowchart GUI 108 is also in communication with compiler 110. After compiler 110 receives inputs from flowchart GUI 108 and semantic mapper 114, compiler 110 compiles the received inputs into ontologies 112. In a general sense, an ontology formally represents knowledge as a hierarchy of concepts within a domain (e.g., a network), using a shared vocabulary to denote types, properties and interrelationships of the concepts. Flowchart GUI 108, compiler 110, ontologies 112, and semantic mapper 114 form workflow editor 106.

Ontologies 112, obtained from workflow editor 106, are fed into knowledge base 124. Knowledge base 124 also receives ontologies 118 derived from existing intellectual capital 122. Knowledge base 124 works as a repository for storing ontologies, either ontologies 118 received from semantic compiler 116 or ontologies 112 received from workflow editor 106. In some embodiments, knowledge base 124 stores ontologies based on technology expertise, workflows and algorithms, best practices and validated designs, and business rules and policies. Existing intellectual capital 122 can represent any pertinent network data with respect to issues faced in configuration and operation of networks and corresponding solutions for the issues, collected throughout years, and essentially any information thought to be useful in handling different network devices and configurations. Existing intellectual capital 122 can be filled by knowledgeable parties, including engineers, experts, technical assistant center (TAC), and advanced services (AS), etc. Alternatively and advantageously, authorized third party users, having an acceptable level of knowledge in networks can also contribute by adding to existing intellectual capital 122.

Compiler 120 is fed by existing intellectual capital 122. Compiler 120 compiles received inputs from existing intellectual capital 122 into ontologies 118. Compiler 120 and ontologies 118 both form semantic compiler 116.

Ontologies 128, from knowledge base 124, are also inputs into semantic machine reasoning engine 126. In addition to ontologies 128, semantic machine reasoning engine 126 includes reasoner 130 and actuator 132. Reasoner 130 generates inferences 134. In accordance with various aspects of the subject technology, inferences 134 can include root cause analysis and remedy identification, consistency/compliance checking, and conflict detection and resolution.

Actuator 132 can generate conclusions 136 for network applications 138, recommendations 140 for operator 102, and remediation 142 for enterprise network 144. Outputs of actuator 132 include conclusions 136, recommendations 140, and remediations 142. In some embodiments, recommendations 140 can be presented to operator 102 as an alert, application programming interface (API) notification, recommended actions and recommended remediation.

Semantic machine reasoning engine 126 can be embedded as part of a network controller such as CISCO TECHNOLOGIES enterprise network controller DNAC (DIGITAL NETWORK ARCHITECTURE CENTER) 146 of the enterprise network 144. DNAC 146 is an enterprise network controller that can include many functions including, among other functions, authentication for entities interacting on enterprise network 144.

There are numerous advantages associated with architecture 100 illustrated in FIG. 1 and using semantic machine reasoning engine 126. Architecture 100 provides the possibility of curating knowledge base 124 of automated workflows, capturing domain expertise across development, test, services, customers, partners, etc. Furthermore, architecture 100 makes community-driven contribution possible through a simple user interface and requires no central bottleneck.

Thanks to the workflow-oriented nature of architecture 100, troubleshooting a specific problem or class of problems is made possible. Also, the workflow-oriented nature of architecture 100 provides the possibility of composing complex workflows from modular biding blocks.

Thanks to architecture 100, semantic models can be automatically generated from network/device data models. Also, logic and data can be separated to support multi-domain logic. Architecture 100 allows deployment-specific customization of logic and enables users to build workflows. Due to the intelligence built into architecture 100, no coding/scripting skills are required. Architecture 100 provides a prominent feature of being extensible with new knowledge. Architecture 100 can also employ highly efficient semantic reasoners that handle rule chaining.

Figure 2:
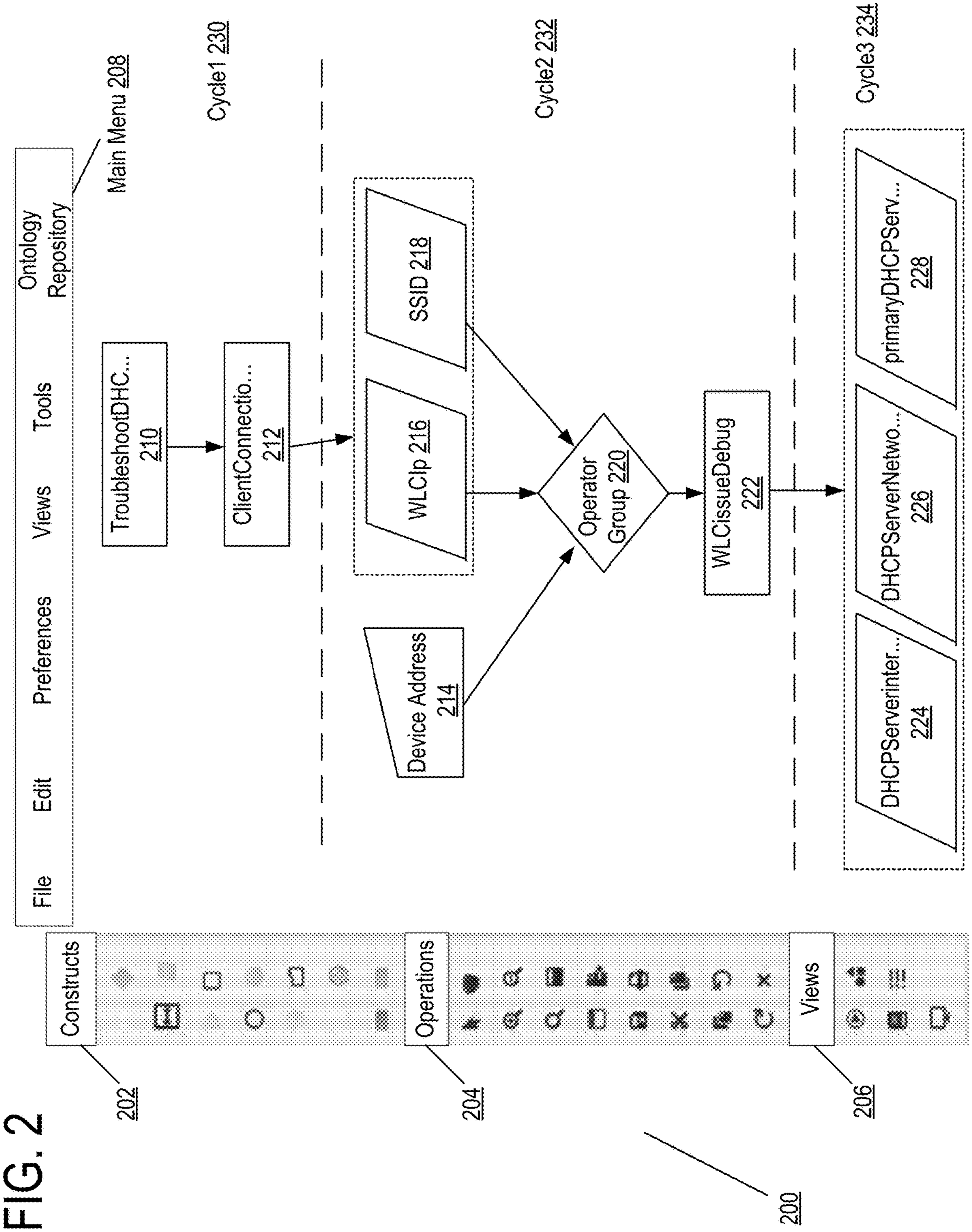
FIG. 2 illustrates an example embodiment of a workflow editor for creating workflows and flowcharts, in accordance with some aspects of the present technology.

FIG. 2 illustrates an example workflow editor 200 for creating flowcharts, in accordance with various aspects of the subject technology. It is to be appreciated that workflow editor 200 can include further features that are not included in FIG. 2.

In some embodiments, constructs 202 provides different blocks, each associated with predetermined functionality. Blocks in constructs 202 can be presented in different shapes and colors to distinguish each presented block. A user can drag and drop blocks from constructs 202. In addition to different blocks shown in constructs 202, the user can select appropriate connections to connect different blocks.

Operations 204 can include standard options found in common graphical user interfaces such as a pointer, zoom in, zoom out, save, cut, search, copy, paste, undo, save, delete, duplicate, print, etc. In some embodiments, other options, pertinent to workflow editor 200 and workflows can be included in operations 204. Views 206 provides different options for viewing workflows.

According to some embodiments, main menu 208 provides some standard options such as file, edit, preferences, views, tools, etc. In some embodiments, main menu 208 can include ontology repository, wherein ontologies associated with workflows are stored. As previously explained, an ontology formally represents knowledge as a hierarchy of concepts within a domain (e.g., a network), using a shared vocabulary to denote types, properties and interrelationships of the concepts. The user can explore options in main menu 208 and select them accordingly. In some embodiments, and according to the expertise level of the user, the user may not fully comprehend some of the options implemented in main menu 208. For instance, ontologies under the ontology repository may seem incomprehensible to the user.

In some embodiments, the user can create flowcharts and workflows in different cycles: cycle1230, cycle2 232, and cycle3 234. The user can establish connections between different cycles via connections selectable from constructs 202. In cycle1 230, troubleshootDHC 210 denotes troubleshooting associated with dynamic host configuration protocol (DHCP) server. Clientconnection 212 denotes a client connection.

In some embodiments, cycle2 232, device address 214 denotes an address associated with a device. WLCIp 216 denotes a wireless local area network controller (WLC). SSID 218 denotes a service set identifier (SSID). Operator group 220 is fed by device address 214, WLCIp 216, and SSID 218. WLCissueDebug 222, fed by operator group 220, is responsible for debugging an issue associated with the wireless local area network controller (WLC).

According to some embodiments, DHCPServerinter 224, DHCPServerNetwork 226, and primaryDHCPServer 228 receive inputs from WLCissueDebug 222.

Workflow editor 200 enables the user to focus on workflow logic rather than a knowledge representation (KR) language. The knowledge representation (KR) language is a form of representation of information that can be used by a computer system to solve complex tasks. In other words, the user does not need to have in-depth knowledge of network systems to be able to create workflows in workflow editor 200. The user can use workflow editor 200 without writing any code/script. Also, and as is evident in FIG. 2, workflow editor 200 employs generic flowchart building blocks. Workflow editor 200 provides an environment in resource description framework (RDF), web ontology language (OWL), and semantic web rule language (SWRL). After creation of workflows by the user, created workflows should be compiled into the knowledge representation (KR) language. A compiler, not shown in FIG. 2, is responsible for handling the automatic generation of the knowledge representation (KR) language. The user of workflow editor 200 is oblivious to processes and compiling run behind flowcharts and workflows the user has created. In some embodiments, workflow editor 200 does active validation, while editing, to eliminate ontology errors.

FIG. 3 illustrates different parts of an example web ontology language (OWL) file 300, interpretable by a semantic machine reasoning engine, in accordance with various aspects of the subject technology. As stated previously, an ontology formally represents knowledge as a hierarchy of concepts within a domain (e.g., a network), using a shared vocabulary to denote types, properties and interrelationships of the concepts. Ontology 300 includes relationships 302, concepts 304, and rules 306. Rules 306 represent logic and restrictions for inference. Relationships 302 determine how concepts are interrelated. Concepts 304 signify a vocabulary of terms and specification of their meanings that are interrelated by relationships 302 and used to create rules 306.

Figure 4:
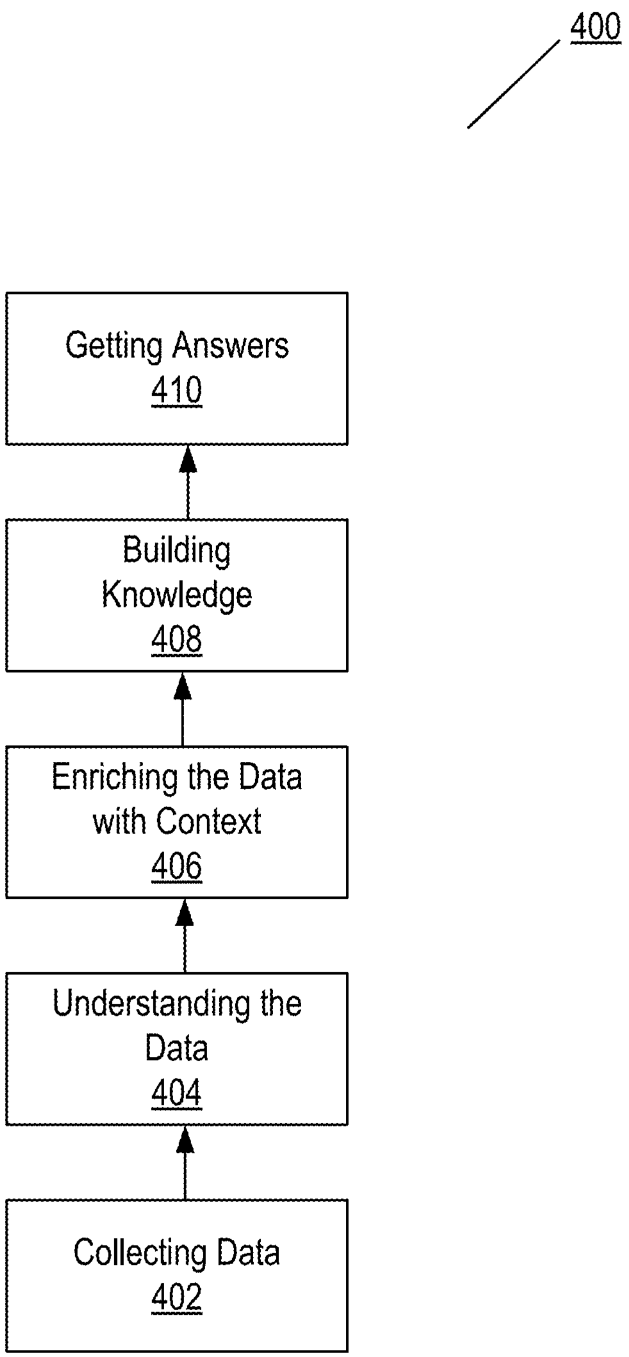
FIG. 4 illustrates an example process for data chain performed by a semantic machine reasoning engine, in accordance with some aspects of the present technology.

FIG. 4 illustrates an example process 400 for data chain performed by a semantic machine reasoning engine, in accordance with some aspects of the subject technology. It is to be noted that steps outlined in the process 400 are provided by way of example, as there are a variety of ways to carry out the steps. Additionally, while the steps are illustrated with a particular order of blocks, those of ordinary skill in the art will appreciate that the blocks can be executed in any order and can include fewer or more blocks than illustrated. A person of an ordinary skill in the art may determine that some of the steps outlined in FIG. 4 are not essential without parting from the spirit and scope of the disclosure.

In FIG. 4, the process 400 starts with collecting data 402. Collecting data 402 can include collecting network data, endpoint meta-data, and application meta-data. After collecting data 402, the process 400 proceeds to understanding the data 404. Understanding the data 404 can be achieved through machine vocabulary and machine grammar. Machine vocabulary can be defined using resources, i.e. identified things that have uniform resource identifiers (URIs). Machine vocabulary can also be defined using literals that have concrete values and types, which can also be identified by URIs. Machine grammar uses resource description framework (RDF) for going from URIs to statements.

After understanding the data 404, the process 400 proceeds to enriching the data with context 406. In enriching the data with context 406, machine grammar uses resource description framework schema (RDFS) to determine properties, which is relationships between things and classes, which is buckets to group things. In enriching the data with context 406, individual statements are linked together. Subject of one statement becomes the object of another, thereby a context is established. In some embodiments, enriching the data with concepts 406 may even include acquiring new data elements pertinent to the data.

After enriching the data with context 406, the process 400 proceeds to building knowledge 408. In some embodiments, building knowledge 408 represents some processes that use the enriched data received from enriching the data with context 406 to generate some inferences. After building knowledge 406, the process 400 proceeds to getting answers 410. In some embodiments, getting answers 410 may involve informing a user of the semantic machine reasoning engine about progresses made by the semantic machine reasoning engine.

Figure 5:
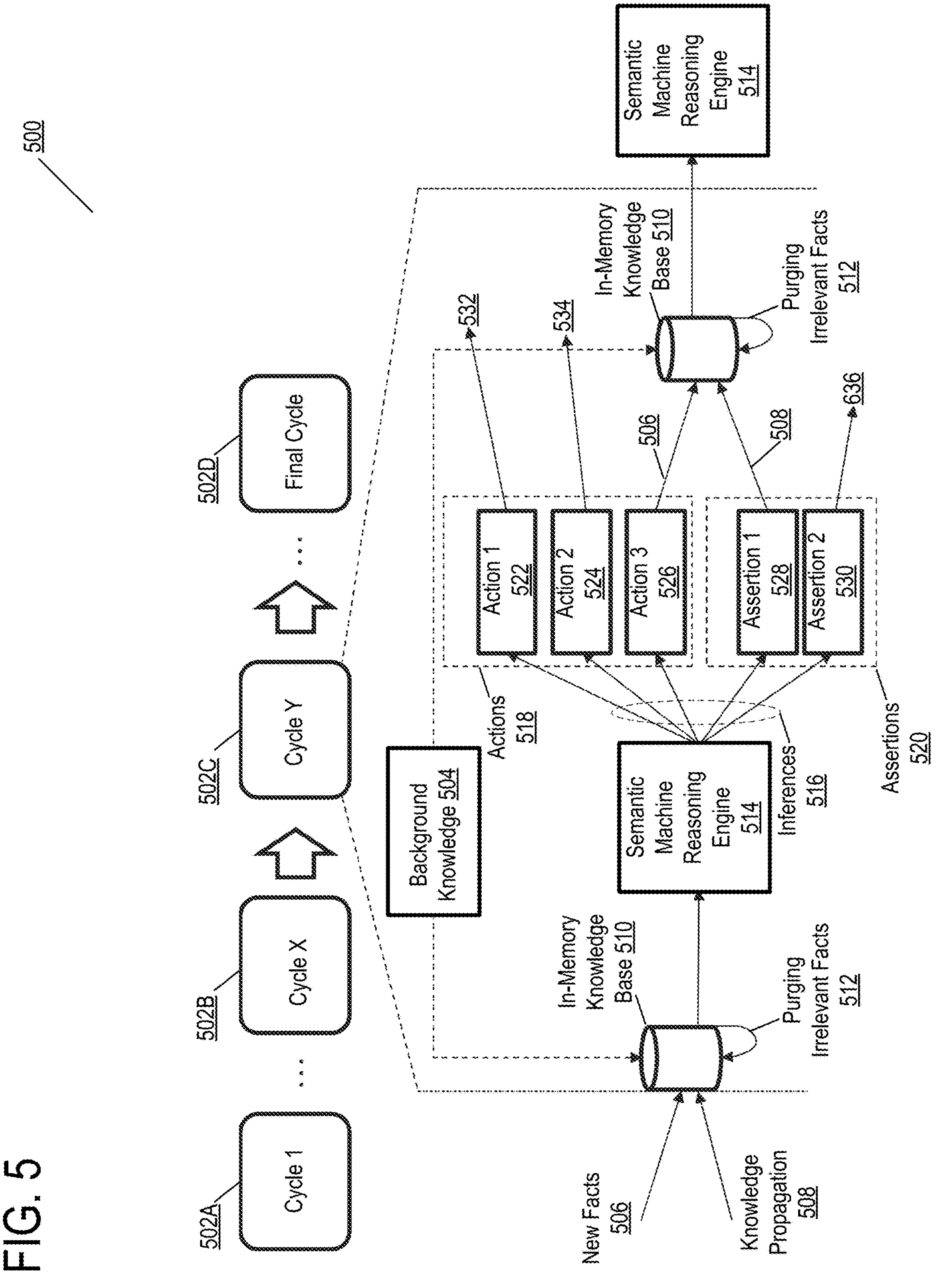
FIG. 5 illustrates an example process for executing workflows by a semantic machine reasoning engine in different cycles, in accordance with some aspects of the present technology.

FIG. 5 illustrates an example process 500 of executing workflows by a semantic machine reasoning engine in different cycles, in accordance with various aspects of the subject technology. The purpose of partitioning into cycles is to limit the amount of data that is presented to the semantic machine reasoning engine at any given point in time. One-shot presenting all data to the semantic machine reasoning engine is not a pragmatic approach, because of at least two reasons. The first reason is collecting all of the needed data for executing workflows by the semantic machine reasoning engine is quite unlikely. The second reason is pertinent to the amount of time the semantic machine reasoning engine takes to analyze massive volumes of data. If partitioning into cycles is not performed, the amount of time for analyzing massive volumes of data by the semantic machine reasoning engine will be around hours, if not days, which is counter-productive to purposes of the subject technology.

To address the above-mentioned drawbacks of presenting all data at once to the semantic machine reasoning engine, a new solution is needed to present data to the semantic machine reasoning engine in different cycles. FIG. 5 illustrates a method of only fetching new data when a new piece of data is needed for analysis by the semantic machine reasoning engine.

Three main advantages can be enumerated in association with executing workflows in different cycles. First, executing workflows in different cycles enables a contextual, just-in-time data acquisition model by the semantic machine reasoning engine. In other words, the semantic machine reason engine acquires data only when is required and only when is needed.

The second advantage associated with executing workflows in different cycles is providing the possibility of managing the memory footprint of in-memory knowledge-base by actively purging irrelevant facts. Stated differently, facts that are no longer consequential in reasoning are purged without breaking rule chaining.

The third advantage associated with executing workflows in different cycles is that it enables a subject matter expert to specify the sequence of evaluation of rules, when required, instead of delegating that to the semantic machine reasoning engine. In other words, a manual control strategy over sequencing is provided.

In FIG. 5, the semantic machine reasoning engine executes workflows through different cycles, namely from cycle 1 502A to final cycle 502D. FIG. 5 details the steps involved in carrying out any cycle. For example, FIG. 5 illustrates the steps involved in executing cycle Y 502C.

Background knowledge 504 comprises ontologies that are essential in executing workflows by the semantic machine reasoning engine. In-memory knowledge base 510 receives background knowledge 504, presented in the form of ontologies. In-memory knowledge base 510 also receives new facts 506 and knowledge propagation 508 in the form of facts. New facts 506 represent new pieces of data, compiled into ontologies. Knowledge propagation 508 are inferred facts generated in cycle X 502B, a cycle prior to cycle Y 502C. Throughout executing workflows by the semantic machine reasoning engine, if it is determined that an additional data element is needed to move forward in the analysis, the network or other data sources are checked to fetch the additional data element. In-memory knowledge base 510 performs purging irrelevant facts 512 in order to expunge inconsequential facts that are no longer useful in executing workflows. Purging irrelevant facts 512 may include purging received statements in the form of new facts 506, or knowledge propagation 508, or background knowledge 504.

Semantic machine reasoning engine 514 receives ontologies that are determined to be useful in executing workflows by semantic machine reasoning engine 514. Semantic machine reasoning engine 514 is similar to semantic machine reasoning engine 126 in FIG. 1 or semantic machine reasoning engine 832 in FIG. 8, which will be described later.

Semantic machine reasoning engine 514 analyzes received knowledge in the form of ontologies and draws inferences 516. Inferences 516 either trigger some actions or make some assertions. Inferences 516 can be categorized into two main categories: actions 518 and assertions 520. Actions 518 can include action 1 522, action 2 524, and action 3 526. Assertions 520 can include assertion 1 528 and assertion 2 530. Action 1 522 may include a logging action or an auditing action, performed on external services and systems 532. Action 2 524 may include a remediation action, involving remediating a network issue or enhancing functionality or generally provisioning services and systems 534. Action 3 526 may include an action for data collection, involving collecting new facts 506.

Assertion 1 528 may include caching working memory, involving transferring knowledge propagation 508 to in-memory knowledge base 510. Assertion 2 530 may include conclusions derived by the semantic machine reasoning engine, conveyed to user interface 536. A user can monitor the conclusions via user interface 536. In some embodiments, the user may even interfere with executing workflows by the semantic machine reasoning engine in each cycle via user interface 536.

Figure 6:
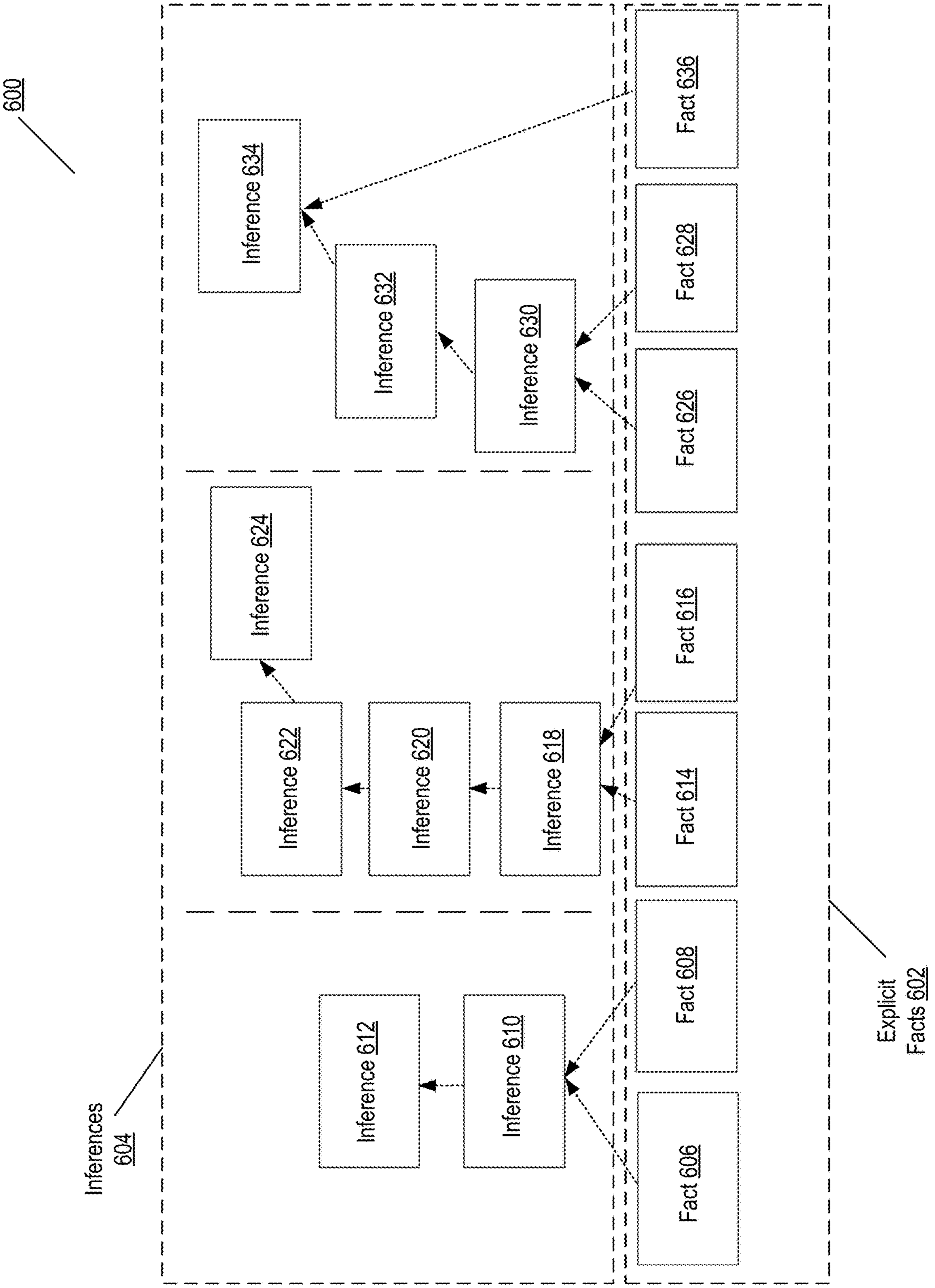
FIG. 6 illustrates an example embodiment for determining why a wireless client failed to obtain internet protocol (IP) address within a network, in accordance with some aspects of the present technology.

FIG. 6 illustrates an example 600, in which the present technology is used to determine why a wireless client failed to obtain internet protocol (IP) address within a network. A semantic machine reasoning engine determines why the wireless client failed to get IP address. The semantic machine reasoning engine performs this determination through drawing some inferences based upon some given explicit facts.

In FIG. 5, it was illustrated how reasoning can be split into different cycles. FIG. 6 illustrates an example, in which each round of drawing an inference can be interpreted as a reasoning cycle shown in FIG. 5. In FIG. 6, each new drawn inference is the result of a cycle of reasoning. After the new inference in yielded, the new inference is provided to a knowledge base (not shown in FIG. 6) to be used in the next cycle of reasoning.

In FIG. 6, explicit facts 602 include fact 606, fact 608, fact 614, fact 616, fact 626, fact 628, and fact 636. Fact 606 states that the wireless client has media access control (MAC) address as: "aa:bb:cc:dd:ee:ff", for example. Fact 608 represents topology of the network. Also, fact 636 states the issue at hand, which is the wireless client failed to obtain IP address.

From both fact 606 and fact 608, inference 610 is drawn, in which it is inferred that the wireless client is associated with a service set identifier (SSID) called "blizzard". Based on inference 610, inference 612 is drawn. Inference 612 denotes that wireless local area network controller (WLC) associated with the wireless client is "rtp-4-wlc10". As stated above, each inference, for example inference 610 and inference 612, are added to the knowledge base to be used in the next cycle of reasoning. In the next cycle of reasoning, inference 610 and inference 612 are interpreted as fact 616 and fact 614, respectively. Fact 616 states that the wireless client is associated with the SSID called "blizzard". Also, fact 614 states that WLC associated with the wireless client is "rtp-4-wlc10".

Based on fact 614 and fact 616, inference 618 is drawn, which states that service set identifier (SSID) "blizzard" in WLAN is "Employee". Inference 620 is drawn based upon inference 620. Inference 620 states that SSID "blizzard" on interface is "VLAN10". Inference 620 is the ground for drawing inference 622, which states that VLAN10 on internet protocol (IP) subnet is "10.10.10.0/24". Based upon inference 622, inference 624 is obtained. Inference 624 reveals that primary dynamic host configuration protocol (DHCP) server for subnet is "10.10.10.1". Inference 622 and inference 624 are added to the knowledge base to be used in the next cycle of reasoning. In the next cycle of reasoning, inference 622 and inference 624 are interpreted as fact 628 and fact 626, respectively. Fact 628 states that VLAN10 on IP subnet is "10.10.10.0/24". Also, fact 626 states that DHCP server for subnet is "10.10.10.1".

Based upon fact 626 and fact 628, inference 630 is drawn, stating that internet protocol (IP) address pool for subnet is "Pool23". In inference 632, it is inferred that "Pool23" has a pool-size of 254 and all of 254 addresses within "Pool23" have been leased. Finally and based upon inference 632 and fact 636, inference 634 is deduced. Inference 634 asserts that the wireless client failed to get IP address because "Pool23" is exhausted, i.e. all addresses available within "Pool23" have been used and there is no address left in "Pool23" to be assigned to the wireless client.

Figure 7:
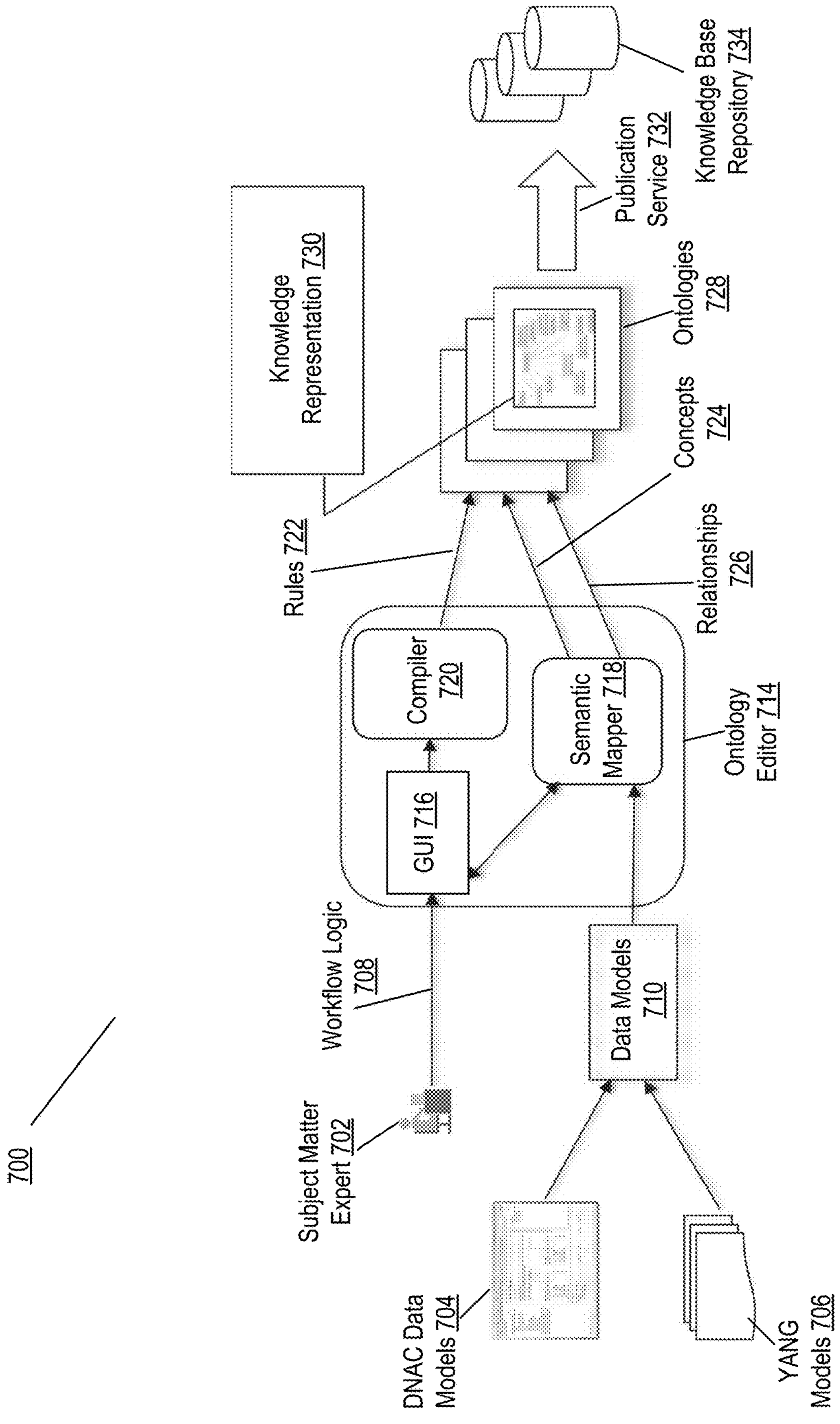
FIG. 7 illustrates an example embodiment of model-driven knowledge capture, in accordance with some aspects of the present technology.

FIG. 7 illustrates an example of model-driven knowledge capture 700, in accordance with various aspects of the subject technology.

In FIG. 7, subject matter expert 702 represents engineers, experts, and technical staff, and generally someone who has profound levels of expertise working in a network environment. Subject matter expert 702 can also represent different teams such as technical assistant center (TAC), advanced services (AS), etc.

A subject matter expert enters workflow logic 708 into GUI 716. GUI 716 is a graphical user interface or more generally any pre-developed environment, capable of receiving workflow logic 708 or similar entities. GUI 716 can provide options, menus, selectable items, operations, and functions that enable subject matter expert 702 to build a variety of workflows and to create different scenarios in a network environment. According to some embodiments of the subject technology, GUI 716 is similar to workflow editor 200 shown in FIG. 2.

In FIG. 7, data models 710 can be created from software development kit from a particular network controller platform such as DNAC data models 710 or data models 710 can be data models written in some other format or language such as YANG models 706. In some embodiments, a software development kit may provide a set of tools, libraries, and documentation to facilitate interaction between a network controller and the present technology. In particular a software development kit might facilitate preparation of data models coming from DNAC. DNAC provides an open, extensible, and software-driven approach that makes networks simpler to manage and more agile and responsive to business needs. DNAC is an intelligent system that encompasses policy, automation, analytics, and open platform capabilities to deliver on all required aspects of an intent-based network.

YANG models 706 represents models developed in yet another next generation (YANG), wherein YANG is a standard-based data modeling language used to create device configuration requests or requests for operational data. Yet another next generation (YANG) has a structured format similar to a computer program that is human readable.

Semantic mapper 718 receives input from data models 710. Semantic mapper 718 can also communicate with GUI 716. Workflows developed in GUI 716 are compiled by compiler 720. GUI 716, compiler 720, and semantic mapper 718 form ontology editor 714. As previously described with respect to FIG. 3, an ontology comprises rules, relationships, and concepts. Semantic mapper 718 generates relationships 726 and concepts 724 of ontologies 728, while compiler 720 generates rules 722 of ontologies 728. Ontologies 728 represent ontologies collected from ontology editor 714. Each ontology in ontologies 728 is called knowledge representation 730.

Ontologies 728 are published through publication service 732 in knowledge base repository 734. Knowledge base repository 734 sustains all knowledge received from subject matter expert 702, DNAC data models 704, and YANG models 706. Knowledge sustained in knowledge base repository 734 is in the form of ontologies.

Figure 8:
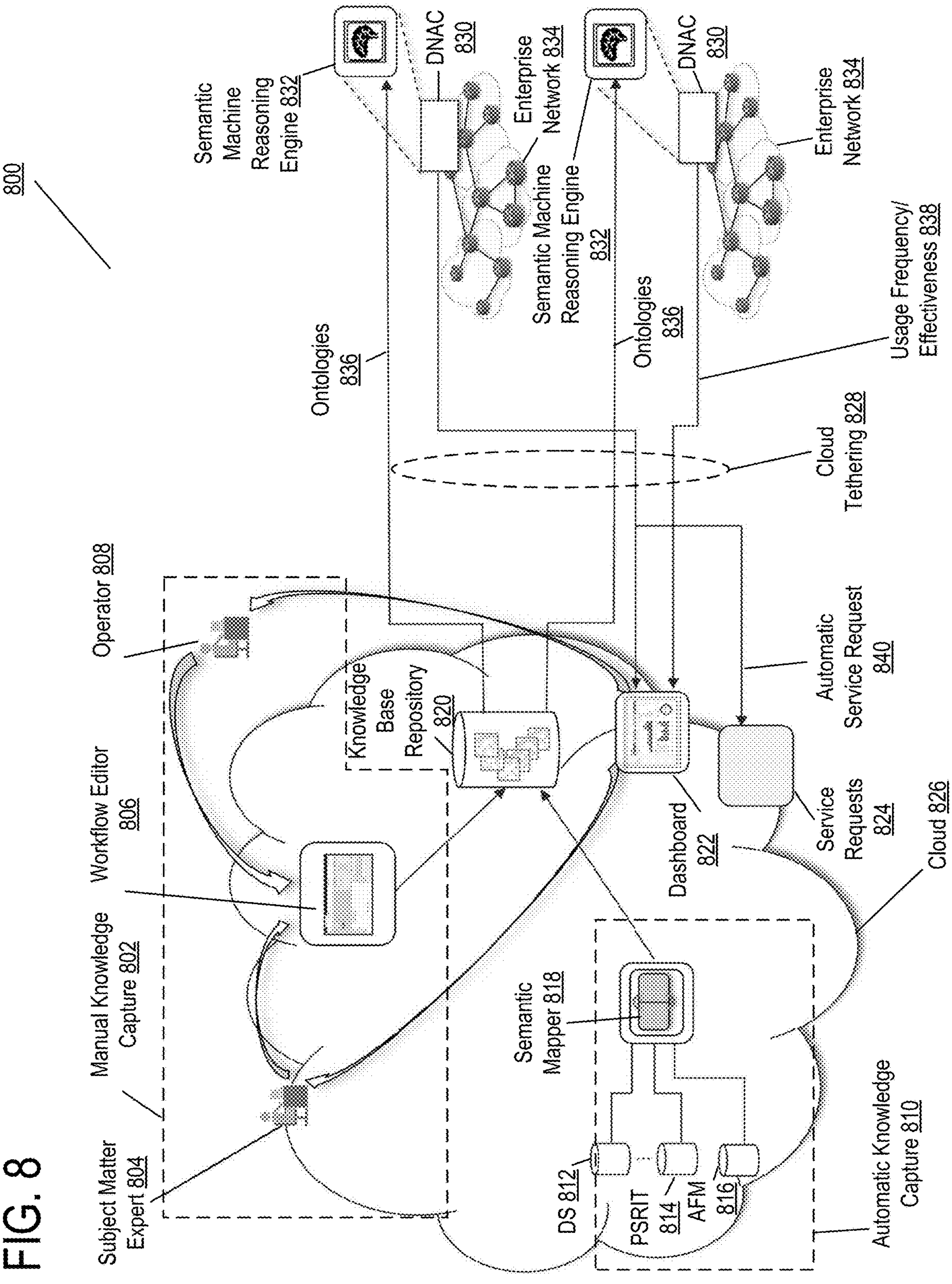
FIG. 8 illustrates an example embodiment of a network controller knowledge-driven automation with an embedded semantic machine reasoning engine, in accordance with some aspects of the present technology.

FIG. 8 shows an example network controller knowledge-driven automation 800 with an embedded semantic machine reasoning engine, in accordance with various aspects of the subject technology.

According to some embodiments of the disclosure, the invention can be used in the context of an enterprise network managed by an enterprise network controller. The invention can be used to build workflows to diagnose problems in the enterprise network, can be used to deploy new devices, create reports, or build any other workflow to carry out tasks on the enterprise network.

In FIG. 8, subject matter expert 804 represents engineers, experts, and technical staff. Also, subject matter expert 804 can represent different teams such as technical assistant center (TAC), advanced services (AS), etc. Subject matter expert 804 contributes in workflow editor 806 by defining hardware capabilities of devices that can be used in workflow editor 806 and outlining software constraints associated with the devices. Further, subject matter expert 804 can manage protocols and feature axioms, conduct troubleshooting and debugging of workflows in workflow editor 806, etc. Subject matter expert 804 can have a profound knowledge of working with workflow editor 806. Further, subject matter expert 804, if authorized, can even do fundamental changes in workflow editor 806, including, but not limited to, enhancing the appearance of menus and options, setting access privileges to workflow editor 806 for different users, modifying software code of workflow editor 806, troubleshooting of workflow editor 806, and improving the functionality of workflow editor 806.

Operator 808 represents people in third party entities including, but not limited to, customers and partners, who are provided with access to workflow editor 806. Through using workflow editor 806 and various blocks and interconnections provided within workflow editor 806, operator 808 can create his own workflow and perform deployment-specific customizations in his created workflows, amongst other actions. Operator 808 may not have expertise or certain privileges similar to subject matter expert 804. Also, operator 808 may not be authorized to make any fundamental change in workflow editor 806. Operator 808 may be allowed to merely create and run workflows in workflow editor 806.

Subject matter expert 804 and operator 808 contribute in building knowledge over time by interacting with workflow editor 806. Operator 808 contributes in building knowledge, for example, by creating and running different workflows in workflow editor 806. Subject matter expert 804 contributes in building knowledge, for example, by troubleshooting workflows created by operator 808. Subject matter expert 804, operator 808, and workflow editor 806 form manual knowledge capture 802.

After operator 808 creates a workflow in workflow editor 806, a compiler (not shown in FIG. 8), which is a part of workflow editor 806, compiles the workflow into web ontology language (OWL) files. OWL files are interpretable by reasoning engine 832. Semantic machine reasoning engine 832 works based on principles of semantic machine reasoning. After the compiler completed its compilation, generated web ontology language (OWL) files are transferred to knowledge base repository 820.

In addition to manual knowledge capture 802 shown in FIG. 8, which captures knowledge created by subject matter expert 804 and operator 808, there is automatic knowledge capture 810. Automatic knowledge capture 810 captures previously collected knowledge with respect to technical issues faced in applications and/or platforms/devices. Automatic knowledge capture 810 houses DS 812, PSIRT 814, and AFM 816, amongst other possible entities that collect and/or receive reports. In FIG. 8, DS 812, PSIRT 814, and AFM 816, and other similar entities that are not shown in FIG. 8, can be useful to increase the security or inform about vulnerabilities.

In FIG. 8, DS 812 signifies diagnostic signatures featuring downloads digitally signed signatures to devices. Diagnostic signatures files are formatted files that collate knowledge of diagnostic events and provide methods to troubleshoot the diagnostic events without a need to upgrade a Cisco software. The aim of employing DS 812 is to deliver flexible intelligence that can detect and collect troubleshooting information that accordingly can be used to resolve known problems in different customer networks.

In FIG. 8, PSPRIT 814 denotes Cisco product security incident response team (PSIRT), which is a dedicated global team that manages receipt, investigation, and public reporting of security vulnerability information that happen across the entire Cisco products portfolio and networks. When PSIRT 814 is notified of a security incident, PSRIT 814 prioritizes and identifies resources, coordinates product impact assessment and fixes, and notifies customers and the public. Consistency, speed, and collaboration atmosphere that provide the possibility of working with product teams across Cisco and third parties, are amongst advantages of PSRIT 814.

In FIG. 8, AFM 816 signifies Cisco automated fault management (AFM) that has the ability to automatically analyze situations and proactively correct errors in a way that is similar to, yet much faster and more accurate than if performed manually. AFM 816 combines automation and machine learning techniques to work behind the scenes and recognizes potential network problems and resolve them. Advantages of using AFM 816 include, but are not limited to, increasing speed of event detection and resolution, saving countless hours of troubleshooting and case management through automation, enhancing network agility and reliability, and providing a better overall customer experience.

Semantic mapper 818 receives inputs from DS 812, PSIRT 814, and AFM 816, and creates ontologies based on the received inputs. Indeed, semantic mapper 818 contributes in knowledge base repository 820 by compiling troubleshooting information, security incidences, security vulnerabilities, reports, solutions, and all other security, vulnerability, and solution information collected in DS 812, PSIRT 814, and AFM 816. It is to be noted that semantic mapper 818 can receive inputs from other entities similar to DS 812, PSIRT 814, and AFM 816 in automatic knowledge capture 810, which are not shown in FIG. 8.

After knowledge base repository 820 receives ontologies from workflow editor 806 and semantic mapper 818, knowledge base repository 820 sends received ontologies to semantic machine reasoning engine 832 through cloud tethering 828. Semantic machine reasoning engine 832 is embedded into a network controller such as CISCO TECHNOLOGIES enterprise network controller DNAC (DIGITAL NETWORK ARCHITECTURE CENTER) 830 of enterprise network 834. Cloud tethering 828 provides possibility of downloading ontology-based version of created workflows and operating upon them by semantic machine reasoning engine 832.

After semantic machine reasoning engine 832 completed working on ontologies 836, semantic machine reasoning engine 832 generates usage frequency/effectiveness 838 and automatic service requests 840. Usage frequency/effectiveness 838 and automatic service requests 840 or representations thereof can be displayed on dashboard 822. Usage frequency/effectiveness 838 and automatic service requests 840 can be presented in different formats and in different expertise levels, comprehensible by subject matter expert 804 and operator 808. Subject matter expert 804 and operator 808 can monitor dashboard 822 and depending upon their level of expertise, interest, and authorization, subject matter expert 804 and operator 804 can interpret contents displayed on dashboard 822 and accordingly modify different entities in workflow editor 806. It is to be appreciated that since expertise levels of subject matter expert 804 and operator 808 may be different, contents displayed on dashboard 822, for example usage frequency/effectiveness 838 and automatic service requests 840, can be designed to match the expertise levels of subject matter expert 804 and operator 808. Cloud 826 accommodates subject matter expert 804, workflow editor 806, knowledge base repository 820, dashboard 822, automatic knowledge capture 810, and service requests 824.

FIGS. 9A, 9B, 9C, and 9D illustrate method embodiments 900 in accordance with some embodiments of the present technology for validating created workflows and determining impacts of the created workflows. Steps and processes outlined herein are non-limiting examples provided for illustration purposes, and can be implemented in any combination thereof, including combinations that exclude, add, or modify certain steps. In some aspects, method 900 and its associated steps and processes may be performed by a system. The system is an example of a computing system, which can be a desktop computer, a laptop, a tablet, a mobile computing device, or generally any computing system, having at least one processor, capable of performing method 900.

Figure 9A:
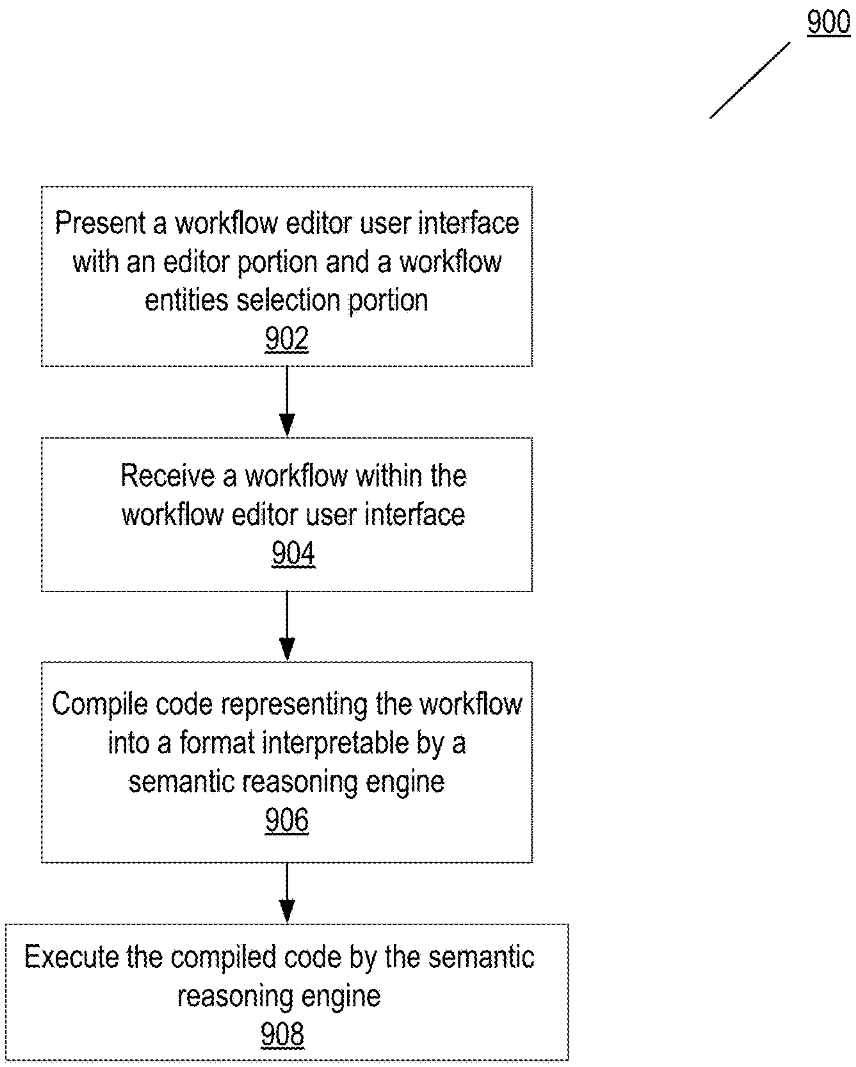
FIGS. 9A, 9B, 9C, and 9D illustrate example method embodiments for validating created workflows and determining impacts of the created workflows, in accordance with some aspects of the present technology.

In FIG. 9A and at operation 902, the system initiates a process, wherein a workflow editor user interface is presented to a user who creates workflows in the workflow editor user interface. The workflow editor user interface comprises an editor portion and a workflow entities selection portion. The editor portion of the workflow editor user interface is where created workflows are displayed to the user. The user can select different workflow entities for the workflow from the workflow entities selection portion. Each workflow entity selected by the user can have a predetermined functionality. In some embodiments, the workflow editor user interface is similar to workflow editor 200 illustrated in FIG. 2.

The user creates a workflow in the workflow editor user interface and the system receives the workflow at operation 904. After receiving the workflow in a pictorial form, the system needs to convert the workflow into a form that is interpretable using semantic reasoning techniques for further processing. At operation 906, the system compiles code representing the workflow into a format. The format is interpretable by a semantic reasoning engine. In some embodiments of the subject technology, the compiled code can be in web ontology language (OWL) format.

At operation 908, the semantic reasoning engine executes the compiled code received from operation 906.

Figure 9B:
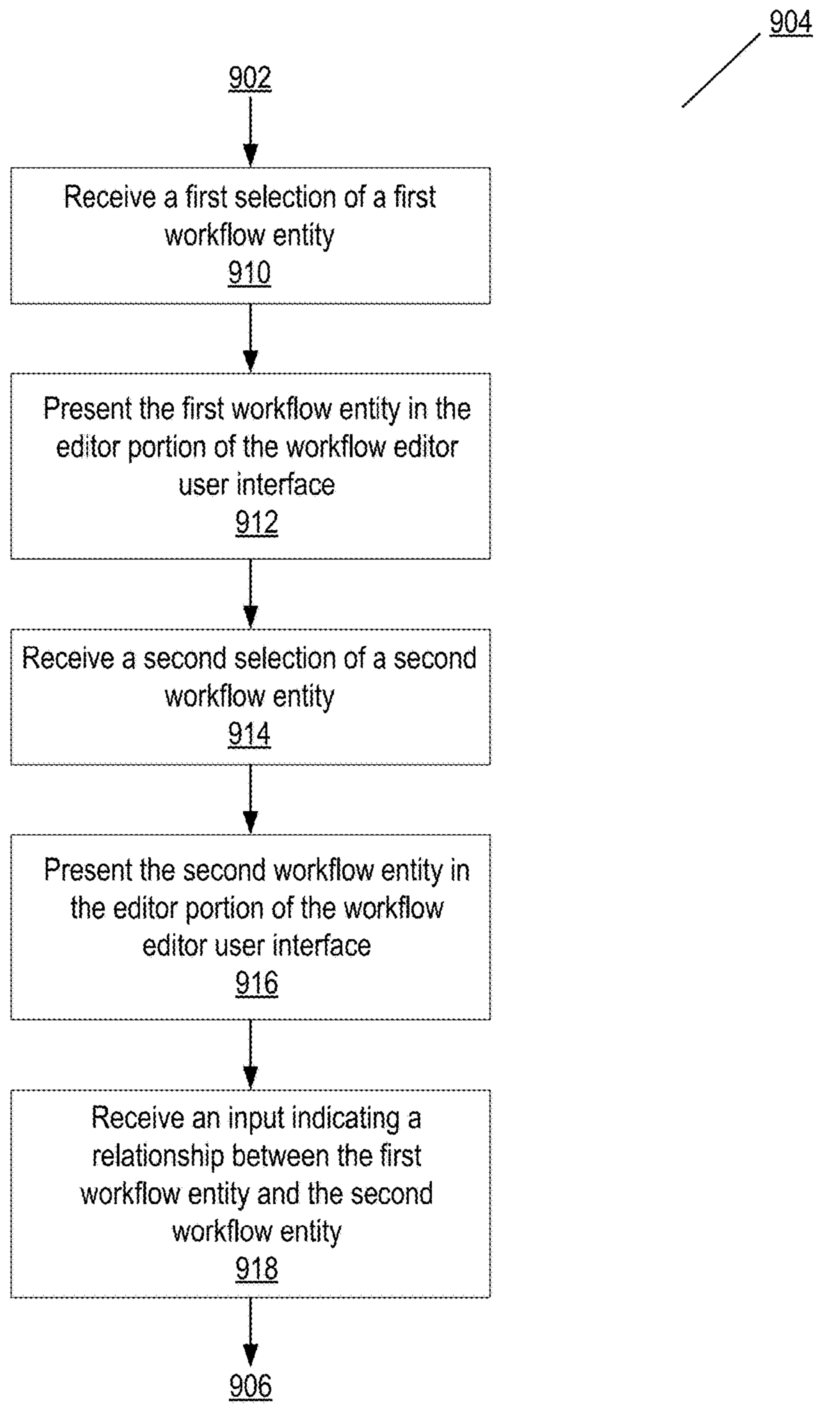

FIG. 9B illustrates steps involved in operation 904 of method 900 in FIG. 9A, in accordance with some embodiments of the subject technology. After the system presented the workflow editor user interface at operation 902, the user of the workflow editor graphical user interface is provided with the possibility to initiate creating the workflow. At operation 910, the system receives a first selection of a first workflow entity selected by the user of the workflow editor graphical user interface. The user selects the first workflow entity from the workflow entities selection portion of the workflow editor user interface. As an example, the user can select the first workflow entity from constructs 202 in FIG. 2. After receiving the first selection of the first workflow entity, the system proceeds to operation 912, in which the system presents the first workflow entity in the editor portion of the workflow editor user interface. After the system presented the first workflow entity, the user can select another workflow entity. At operation 914, the system receives a second selection of a second workflow entity from the user. As an example, the user can select the second workflow entity from constructs 202 in FIG. 2. After receiving the second selection of the second workflow entity, the system presents the second workflow entity in the editor portion of the workflow editor user interface at operation 916. Now that the user has selected the first workflow entity and the second workflow entity from the workflow entities selection portion, the user needs to establish a connection between the first and the second workflow entities. At operation 918, the system receives an input that indicates a relationship between the first workflow entity and the second workflow entity. After completion of operation 918, the process continues to operation 906, illustrated in FIG. 9A.

Figure 9C:
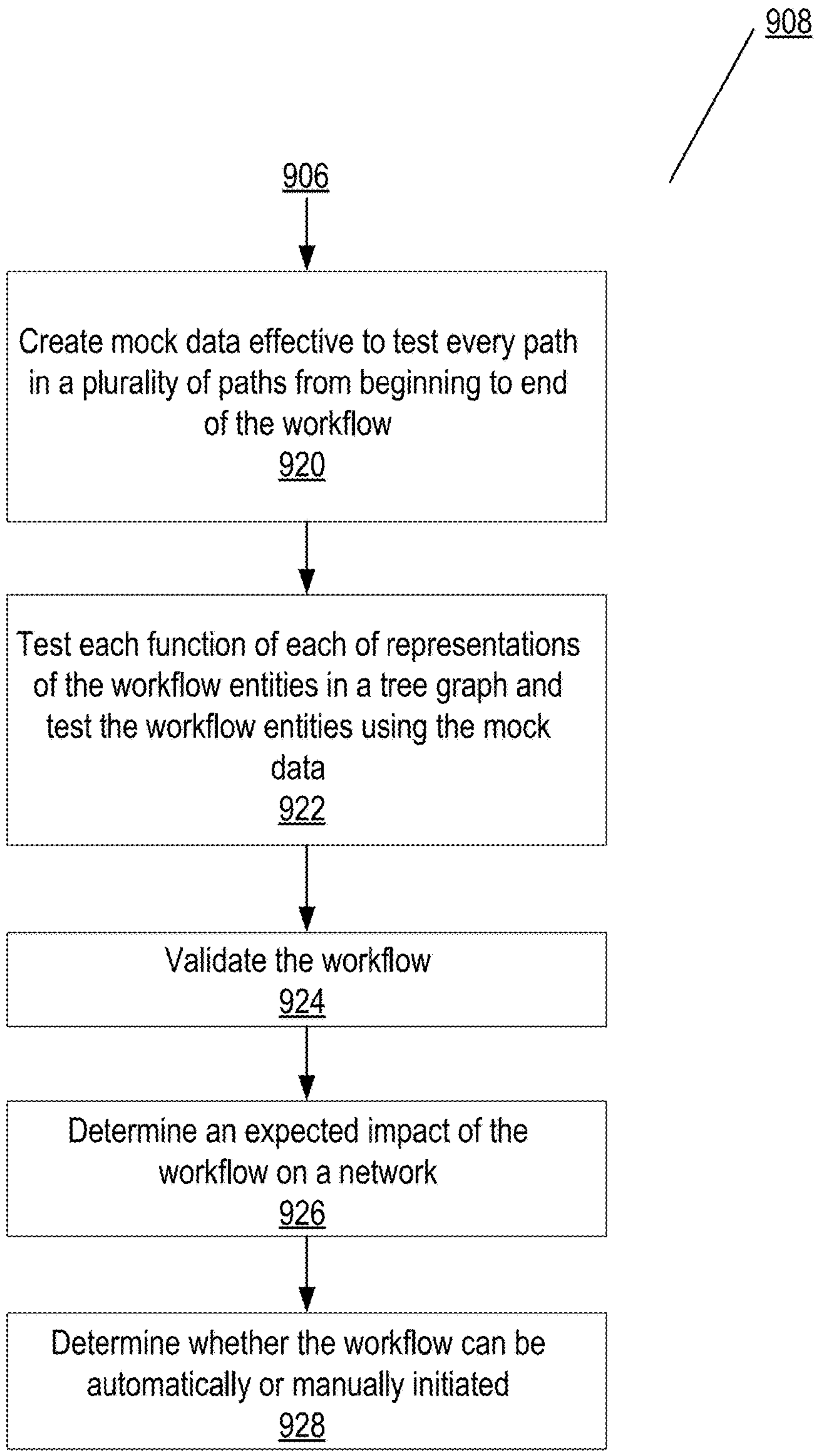

FIG. 9C illustrates further operations involved in operation 908 of method 900 in FIG. 9A, in accordance with some embodiments of the subject technology. Operation 920 receives, from operation 906, the compiled code representing the workflow. The workflow comprises many paths through it. All paths navigating through the workflow should be tested. Testing all paths of the workflow ensures that all decisions and outputs of the workflow correspond to a knowledge that the user intended to convey with the workflow. In some embodiments, the system employs a mock data engine that creates mock data to test all paths of the workflow. At operation 920, the system uses the mock data engine that creates the mock data to test every path in a plurality of paths from beginning to the end of the workflow. After creating the mock data, the process continues to operation 922, wherein the created mock data from operation 920 is used to test each function of each of the representations of the workflow entities in a tree graph using the mock data. The mock data engine traverses the workflow in retrograde, from each output to input. As the mock engine climbs through the workflow, the mock data engine creates a list of data values that reach the output it started from. By pursuing this process for all outputs, the mock data engine creates a set of inputs which traverse all possible paths through the workflow. This constitutes a set of mock data used to test the workflow. After testing each function of each of the representations of the workflow entities at operation 922, the system validates the workflow at operation 924 to examine whether the workflow performs its desired function. Validating the workflow is performed to ensure that each input corresponds to the appropriate output by simply feeding each input into the workflow and measuring the output. After validating the workflow at operation 924, the process proceeds to operation 926, wherein the system determines an expected impact of the workflow on a network. The system determines the expected impact of the workflow on the network as small (S), medium (M), large (L), or extra-large (XL). In some embodiments, the system can communicate the expected impact of the workflow to the user who has created the workflow in the workflow editor user interface. At operation 928 and based upon determining the expected impact of the workflow on the network, the system determines whether the workflow can be automatically or manually initiated. If, for example, the system determines the expected impact of the workflow on the network to be small (S), it is an indication that the workflow can be automatically initiated. However, if the system determines the expected impact of the workflow on the network to be extra-large (XL), it is an indication that the workflow should be triggered by the user. In some embodiments, the system can inform the user whether the workflow can be automatically or manually initiated.

Figure 9D:
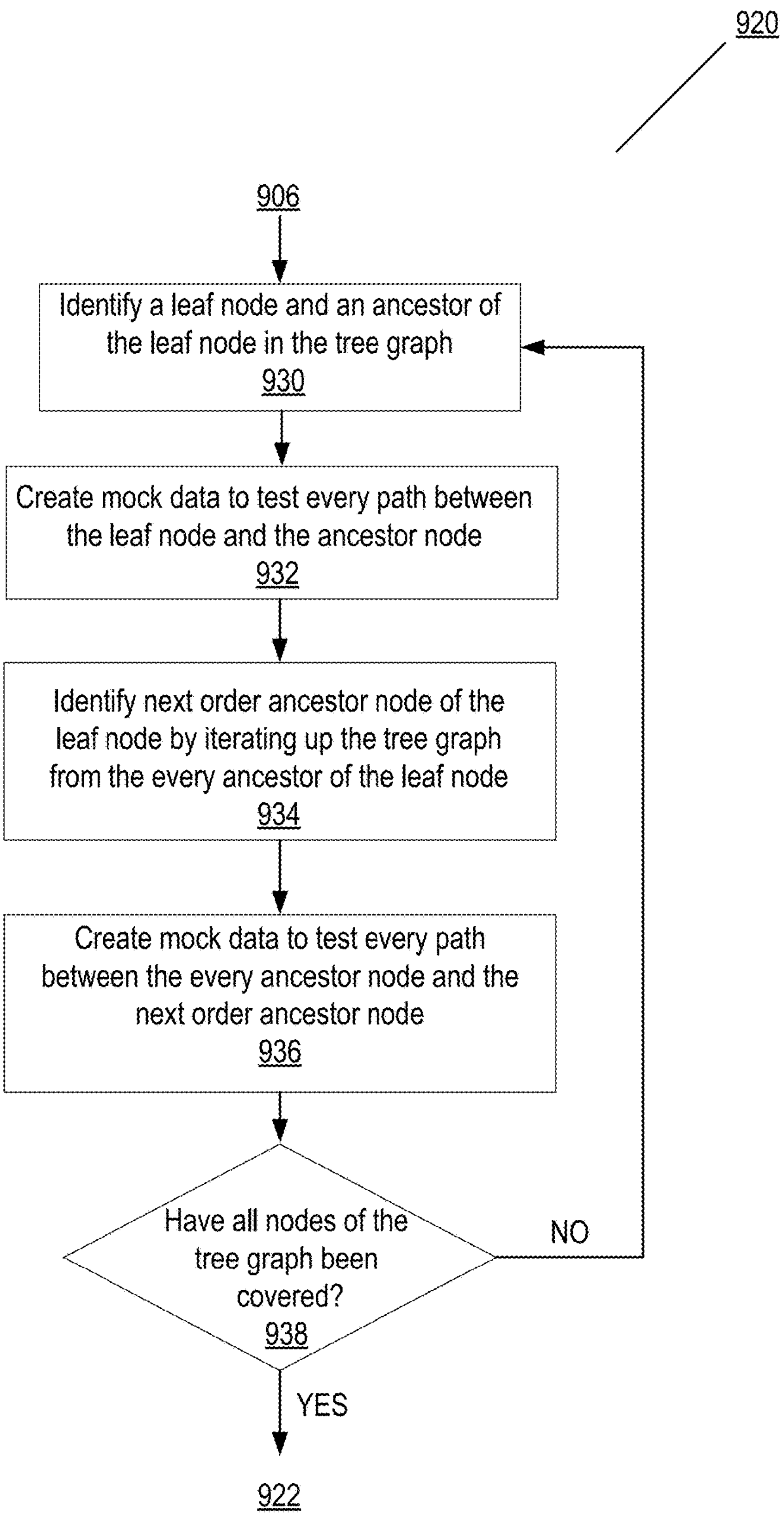

FIG. 9D illustrates further operations involved in operation 920 of FIG. 9C, in accordance with some embodiments of the subject technology. As stated above, operation 920 deals with creating mock data to test every path in the plurality of paths from beginning to the end of the workflow. Creating mock data for testing purposes comprises the following operations. At operation 930, the system identifies a leaf node and an ancestor of the leaf node in the tree graph. Subsequently and at operation 932, the mock data engine creates mock data to test every path between the leaf node and the ancestor node. Since the system needs to find all paths in the plurality of paths, the system should search for another ancestor node of the ancestor node of the leaf node. After operation 932, the system proceeds to operation 934, wherein the system identifies next order ancestor node of the leaf node. The system identifies the next order ancestor node of the leaf node by iterating up the tree graph from every ancestor of the leaf node. At operation 936, the mock data engine creates mock data to test every path between the every ancestor node and the next order ancestor node.

At operation 938, the system determines whether all nodes of the tree graph have been covered. If the system determines that all nodes of the tree graph have not been covered, it means that there is at least one node that the system has not covered. As a result, the system goes back to operation 930 and iterates operations 930, 932, 934, and 936, orderly. If the system determines that all nodes of the tree graph have been covered, it means that mock data for testing all paths of the workflow have been created. As a result, the system proceeds to operation 922, described with respect to FIG. 9C.

Figure 10:
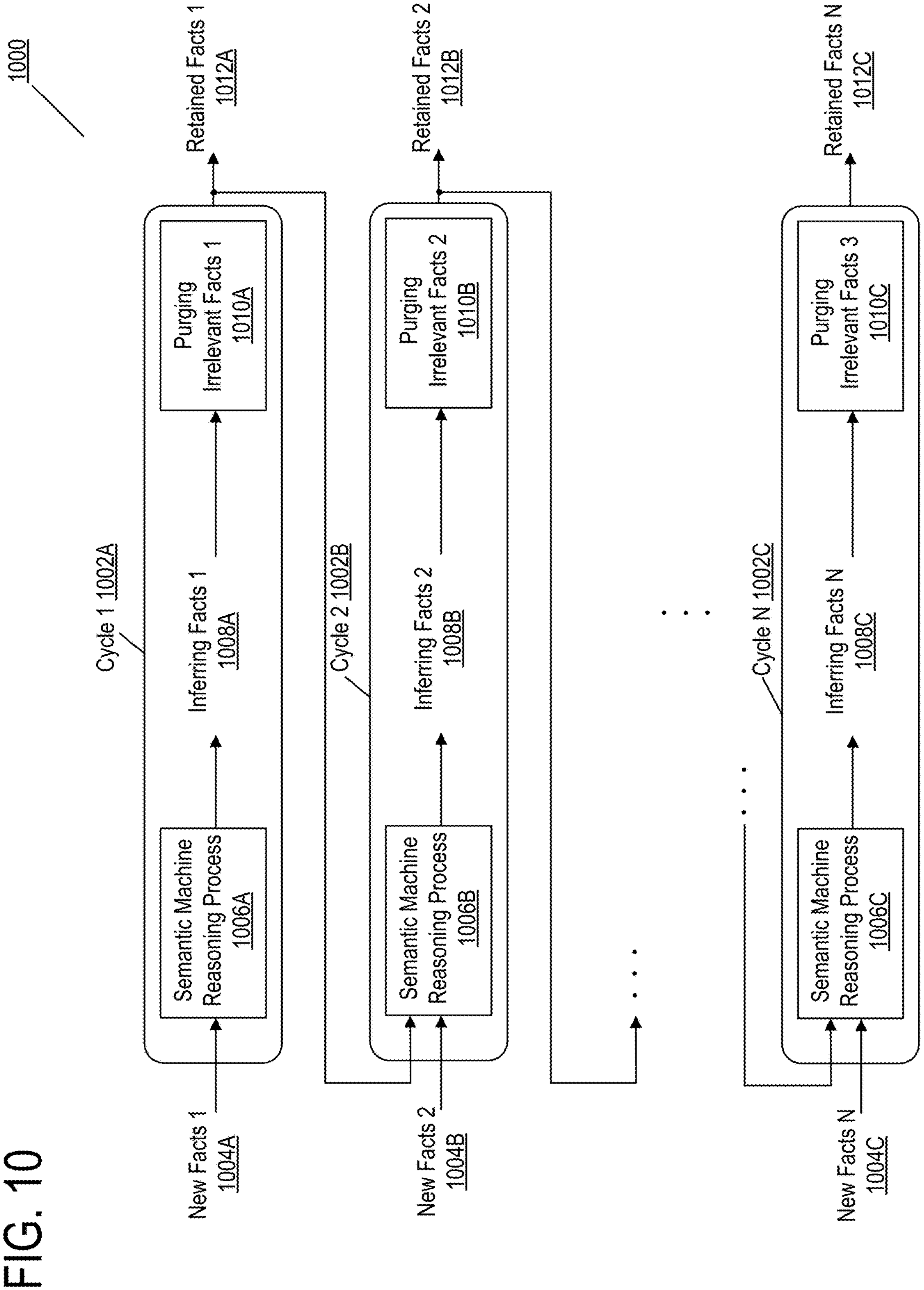
FIG. 10 illustrates an example reasoning process of executing network-based workflows by a semantic machine reasoning engine in different cycles, in accordance with various aspects of the subject technology.

FIG. 10 illustrates an example reasoning process 1000 of executing network-based workflows by a semantic machine reasoning engine in different cycles, in accordance with various aspects of the subject technology.

There can be several downsides associated with not executing the network-based workflows in different cycles. The first downside is, if a network is large, executing the network-based workflows necessitates timely and costly retrieval of data from many devices. The second downside is, if rule sets are large and complex, executing the network-based workflows necessitates repeated calculations. The third downside is, if the number of facts needed to execute the network-based workflows is too large, holding the facts in working memory is troublesome.

In some embodiments, the scalability and performance of the semantic machine reasoning engine used for troubleshooting network applications is dependent upon two main factors: (1) complexity of the rule sets and (2) volume of the facts. Since the rule sets are a function of a workflow that has been created by a subject matter expert, there is very little leeway to optimize the scalability and the performance of the semantic machine reasoning engine. However, managing the volume of facts provides an opportunity to optimize the scalability and the performance of the semantic machine reasoning engine.

In some embodiments, the purpose of executing the network-based workflows in different cycles is managing the volume of facts introduced to the semantic machine reasoning engine. In addition to what was explained previously with respect to FIG. 5, executing the network-based workflows in different cycles reduces computational resource requirements of the semantic machine reasoning engine and thereby improves the scalability and the performance of the semantic machine reasoning engine.

In FIG. 10, the semantic machine reasoning engine (not shown in FIG. 10) initiates the reasoning process from cycle 1 1002A. Cycle 1 1002A includes semantic machine reasoning process 1006A, inferring facts 1 1008A, and purging irrelevant facts 1010A. In cycle 1 1002A, the semantic machine reasoning engine receives new facts 1 1004A. After receiving new facts 1 1004A, the semantic machine reasoning engine performs semantic machine reasoning process 1006A. By performing semantic machine reasoning process 1006A and inferring facts 1 1008A, the volume of facts expands. To decrease the volume of facts and manage the reasoning process more effectively, the semantic machine reasoning engine performs purging irrelevant facts 1 1010A. By performing purging irrelevant facts 1 1010A, the semantic machine reasoning engine purges a number of facts from the volume of facts that are no longer useful in completing the reasoning process. After the semantic machine reasoning engine completes cycle 1 1002A, retained facts 1 1012A are yielded. Retained facts 1 1012A represent facts that are determined by the semantic machine reasoning engine to be useful for completing the rest of the reasoning process.

The semantic machine reasoning engine continues the reasoning process by going through cycle 2 1002B. In cycle 2 1002B, the semantic machine reasoning engine receives new facts 2 1004B and retained facts 1 1012A from cycle 1 1002A. Cycle 2 1002B includes semantic machine reasoning process 1006B, inferring facts 2 1008B, and purging irrelevant facts 1010B. After receiving new facts 2 1004B and retained facts 1 1012A, the semantic machine reasoning engine performs semantic machine reasoning process 1006B. By performing semantic machine reasoning process 1006B and inferring facts 2 1008B, the volume of facts expands anew. To decrease the volume of facts and manage the reasoning process more effectively, the semantic machine reasoning engine performs purging irrelevant facts 2 1010B. By performing purging irrelevant facts 1010B, the semantic machine reasoning engine purges a number of facts from the volume of facts that are no longer useful in completing the reasoning process. After the semantic machine reasoning engine completes cycle 2 1002B, retained facts 2 1012B are yielded. Retained facts 2 1012B represent facts that are determined by the semantic machine reasoning engine to be useful for completing the rest of the reasoning process.

The semantic machine reasoning engine continues the reasoning process in subsequent cycles, similar to cycle 1 1002A and cycle 2 1002B until the semantic machine reasoning engine reaches cycle N 1002C, which is the last cycle in the sequence of cycles of completing the reasoning process.

The semantic machine reasoning engine receives new facts N 1004C and retained facts from a previous cycle. Cycle N 1002C includes semantic machine reasoning process 1006C, inferring facts N 1008C, and purging irrelevant facts 1010C. After receiving new facts N 1004C and the retained facts from the previous cycle, the semantic machine reasoning engine performs semantic machine reasoning process 1006C. By performing semantic machine reasoning process 1006C and inferring facts N 1008C, the volume of facts expands anew. To decrease the volume of facts and manage the reasoning process more effectively, the semantic machine reasoning engine performs purging irrelevant facts 1010C. By performing purging irrelevant facts 1010C, the semantic machine reasoning engine purges a number of facts from the volume of facts that are no longer useful in completing the reasoning process. After the semantic machine reasoning engine completes cycle N 1002C, retained facts N 1012C are yielded.

FIG. 10 illustrates the reasoning process 1000 of executing network-based workflows in different cycles in order to improve the scalability and the performance of the semantic machine reasoning engine. In other words, conducting the reasoning process 1000 in different cycles is directed towards managing the volume of facts that is presented to the semantic machine reasoning engine at any given point in time. By managing the volume of facts, the semantic machine reasoning engine performs the reasoning process more effectively as the semantic machine reasoning engine uses less computational resources from a memory and a CPU.

In accordance with various aspects of the subject technology, the reasoning process 1000 can be further optimized according to a new optimization procedure if facts associated with a device inventory are also managed. In some embodiments, the new optimization procedure allows for the facts associated with the device inventory to be broken down into pages.

Figure 11:
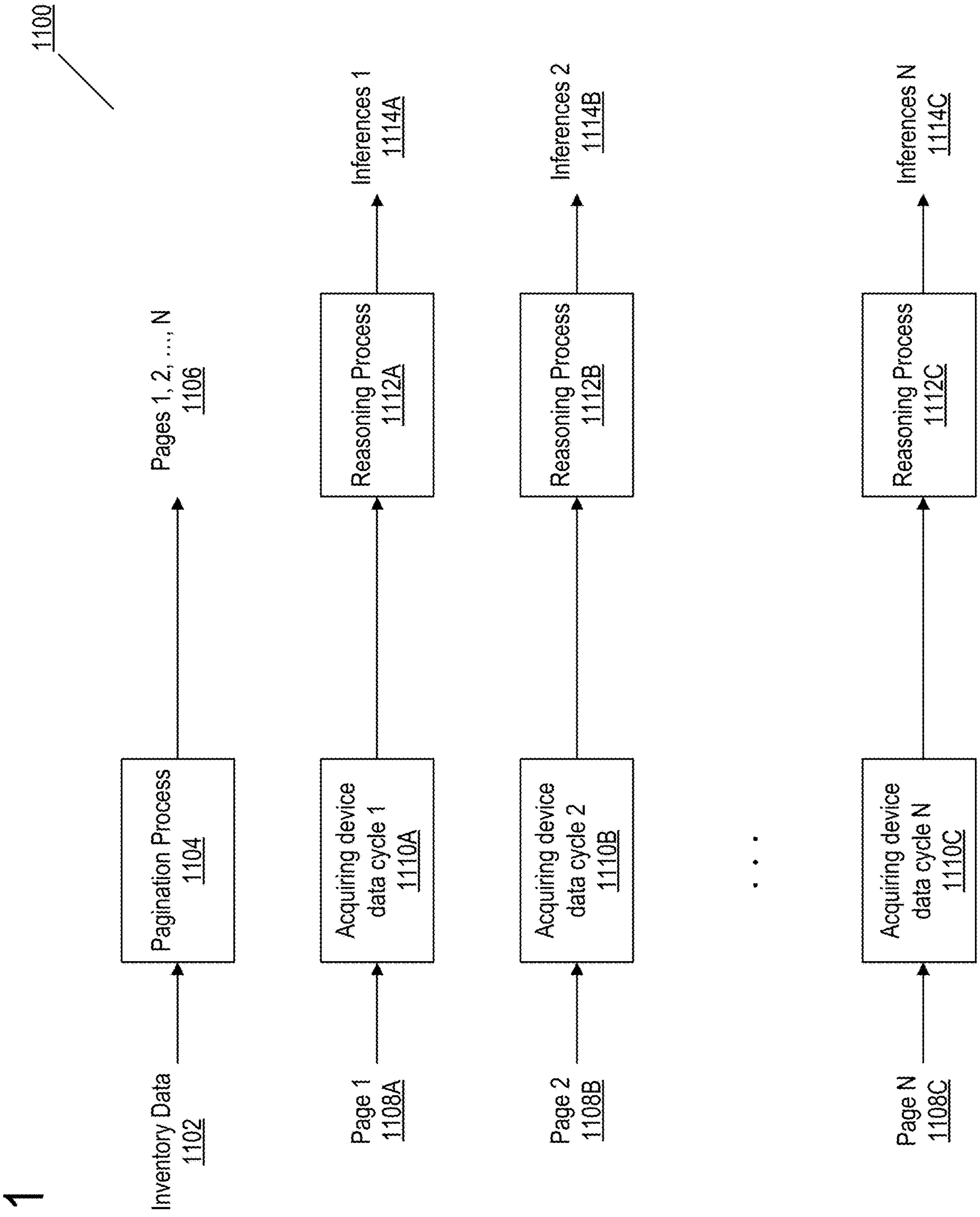
FIG. 11 illustrates an example pagination process of executing network-based workflows by a semantic machine reasoning engine, in accordance with various aspects of the subject technology.

FIG. 11 illustrates an example pagination process 1100 of executing network-based workflows by a semantic machine reasoning engine, in accordance with various aspects of the subject technology.

In FIG. 11, inventory data 1102 goes through pagination process 1104 and pages 1, 2, . . . , N 1106 are yielded. In some embodiments, inventory data 1102 can be a portion of new facts 1 1004A, new facts 2 1004B, or new facts N 1004C in FIG. 10. As described previously with respect to FIG. 10, new facts 1 1004A, new facts 2 1004B, and new facts N 1004C go through semantic machine reasoning process 1006A, semantic machine reasoning process 1006B, and semantic machine reasoning process 10006C, respectively. In some embodiments, inventory data 1102 represents data associated with different devices in a network domain. For example, inventory data 1102 may include data associated with 1000 devices in the network domain. Each page in pages 1, 2, . . . , N 1106 may include a subset of the devices in the network domain and data associated with the subset of the devices. For example, after receiving inventory data 1102 of 1000 devices, pagination process 1104 may generate 10 pages, wherein each page of the generated 10 pages includes 100 devices and data associated with 100 devices in the network domain. At any given point in time, the semantic machine reasoning engine operates on only one page of pages 1, 2, . . . , N 1106.

In accordance with various aspects of the subject technology, pagination process 1100 can be applied to incoming facts at an early point of executing the network-based workflows by the semantic machine reasoning engine. Resulting data, yielded from pagination process 1100 can then be processed in different cycles by the semantic machine reasoning engine, similar to what was described previously with respect to FIG. 10. Similar to performing reasoning process 1000 in different cycles, pagination process 1100 helps in reducing a volume of facts presented to the semantic machine reasoning engine at any given point in time. Consequently, computational resources required by the semantic machine reasoning engine will be reduced.

In FIG. 11, after receiving page 1 1108A, the semantic machine reasoning engine performs acquiring device data cycle 1 1110A. After performing acquiring device data cycle 1 1110A, the semantic machine reasoning engine performs reasoning process 1112A to generate inferences 1 1114A. Afterwards, the semantic machine reasoning engine receives page 2 1108B and performs acquiring device data cycle 2 1110B. After performing acquiring device data cycle 2 1110B, the semantic machine reasoning engine performs reasoning process 1112B to generate inferences 2 1114B. The semantic performs similar steps until reaching the last step. In the last step, after receiving page N 1108C, the semantic machine reasoning engine performs acquiring device data cycle N 1110C. After performing acquiring device data cycle N 1110C, the semantic machine reasoning engine performs reasoning process 1112C to generate inferences N 1114C.

In some embodiments, reasoning processes performed in FIG. 11, namely reasoning process 1112A, reasoning process 1112B to reasoning process 1112C may be the same.

Figure 12:
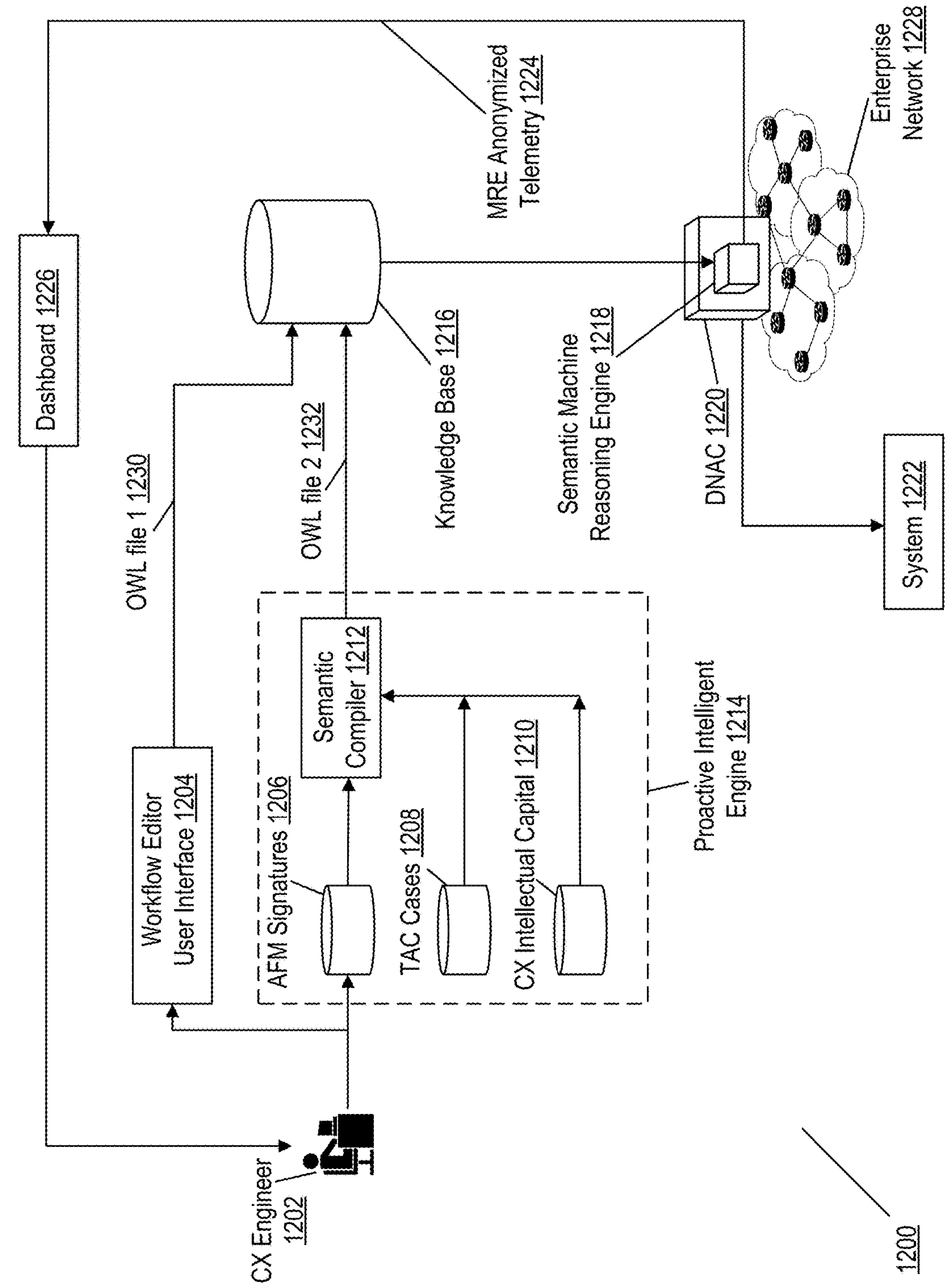
FIG. 12 illustrates an example closed-loop automation system of identifying and fixing issues in a managed network, in accordance with various aspects of the subject technology.

FIG. 12 illustrates an example closed-loop automation system 1200 of identifying and fixing issues in a managed network, in accordance with various aspects of the subject technology.

In FIG. 12, CX engineer 1202 represents engineers, experts, and technical staff, in different teams who has knowledge or experience of working with networks or has coding knowledge. As CX engineer 1202 work with different customers of the network, CX engineer 1202 may capture a significant amount of knowledge. Such knowledge captured by CX engineer 1202 may be represented as rules termed diagnostic signatures. In some embodiments, diagnostic signatures define diagnostic problems for things that may break or are likely to break based on the network.

In some embodiments, CX engineer 1202 can create a network-based workflow in workflow editor user interface 1204. After CX engineer 1202 creates the network-based workflow in workflow editor user interface 1204, a compiler (not shown in FIG. 12), compiles the network-based workflow into web ontology language (OWL) file 1 1230. The compiler is a part of workflow editor user interface 1204. OWL file 1 1230 is interpretable by a semantic machine reasoning engine.

In FIG. 12, automated fault management (AFM) signatures 1206 represents signatures, which is a form of knowledge, that can be compared to data pertaining to the network to identify situations occurring in the network. Also, AFM combines automation and machine learning techniques to work behind the scenes and recognizes potential network problems and resolve them. Advantages of using AFM include, but are not limited to, increasing speed of event detection and resolution, saving countless hours of troubleshooting and case management through automation, enhancing network agility and reliability, and providing a better overall customer experience.

In FIG. 12, TAC cases 1208 represents cases collected in a technical assistant center (TAC). According to some embodiments of the present technology, the cases may include issues reported by customers, partners, resellers, and distributors to the TAC while working with a network. The issues can include detailed information such as expected behavior from the network, detailed observed behavior in the network, recent changes to the network, specific devices in the network, and essentially any information pertinent to the network that could be useful in troubleshooting the issues.

According to some embodiments of the present technology, CX intellectual capital 1210 can represent any pertinent network expert knowledge with respect to issues faced in configuration and operation of networks and corresponding solutions for the issues, collected throughout years, and essentially any information thought to be useful in handling different network devices and configurations. According to some embodiments, CX intellectual capital 1210 can represent sets of rules created by Cisco engineers. In some embodiments, CX intellectual capital 1210 can be filled by knowledgeable parties, including engineers, experts, and advanced services, etc.

Authorized third party users, having an acceptable level of knowledge in networks can also contribute by adding to CX intellectual capital 1210.

In some embodiments, knowledge stored in AFM signatures 1206, TAC cases 1208, and CX intellectual capital 1210 is transferred to semantic compiler 1212. Semantic compiler 1212 can be similar to the compiler, embedded within workflow editor user interface 1204. Semantic compiler 1212 compiles the knowledge received from AFM signatures 1206, TAC cases 1208, and CX intellectual capital 1210 into web ontology language (OWL) file 2 1232. OWL file 2 1232 is interpretable by the semantic machine reasoning engine. AFM signatures 1206, TAC cases 1208, CX intellectual capital 1210, and semantic compiler 1212 form proactive intelligent engine 1214.

In FIG. 12, knowledge base 1216 receives OWL file 1 1230 and OWL file 2 1232 from workflow editor user interface 1204 and semantic compiler 1212, respectively. In some embodiments, knowledge base 1216 acts as a repository for storing ontologies and essentially any knowledge collected by different entities, including CX engineer 1202.

In some embodiments, semantic machine reasoning engine 1218 is embedded into a network controller managed network environment such as CISCO TECHNOLOGIES enterprise network controller DNAC (DIGITAL NETWORK ARCHITECTURE CONTROLLER) 1220 of enterprise network 1228. Semantic machine reasoning engine can receive the ontologies stored in knowledge base 1216. The ontologies stored in knowledge base 1216 can include OWL file 1 1230 and OWL file 2 1232. The ontologies stored in knowledge base 1216 represent captured knowledge.

To identify an issue with enterprise network 1228, DNAC 1220 collects events from enterprise network 1228. Through semantic machine reasoning engine 1218, DNAC 1220 checks to see if the events match any of the ontologies stored in knowledge base 1216. If a match is detected, then additional information may be collected and analyzed by semantic machine reasoning engine 1218 and then a service ticket is automatically opened in system 1222. In some embodiments, system 1222 can be an IT service management (ITSM) system.

According to some embodiments, the ITSM system can be a baseboard management controller (BMC) Remedy. A BMC Remedy ITSM system is a transformative service management platform that significantly improves IT service delivery. The BMC Remedy ITSM system streamlines and automates the processes around IT service desk, asset management, and change management operations. Further, the BMC Remedy ITSM system provides direct access to the impact of IT infrastructure on business services, thus aiding better resource management and planning. According to some embodiments, the ITSM system can be integrated with a digital workflow provider for information technology management such as SERVICENOW.

The opened ticket notifies a customer of a detected issue and prompts the customer for approval of a proposed remedial action. According to some embodiments, the remedial action may be found in the ontologies stored in knowledge base 1216. In some embodiments, the remedial action may be defined by a workflow that needs to be created in workflow editor user interface 1204.

By using system 1214, closed-loop automation 1200 guarantees that the customer is involved in maintenance processes and approves any modifications made to enterprise network 1228. In some embodiments, the customer may not be involved in the maintenance processes of enterprise network 1228. In such cases, per request of the customer, provider of enterprise network 1228 is completely responsible for managing enterprise network 1228.

In FIG. 12, semantic machine reasoning engine 1218 may display machine reasoning engine (MRE) anonymized telemetry 1224 on dashboard 1226. In some embodiments, MRE anonymized telemetry 1224 may include some information pertinent to processes performed by semantic machine reasoning engine 1218. In some embodiments, MRE anonymized telemetry 1224 may include charts and diagrams that display processes, at least in part, performed in closed-loop automation 1200. CX engineer 1202 may monitor dashboard 1226 and apply some changes in workflow editor user interface 1206 or AFM signatures 1206 based on what is displayed on dashboard 1226.

Figure 13:
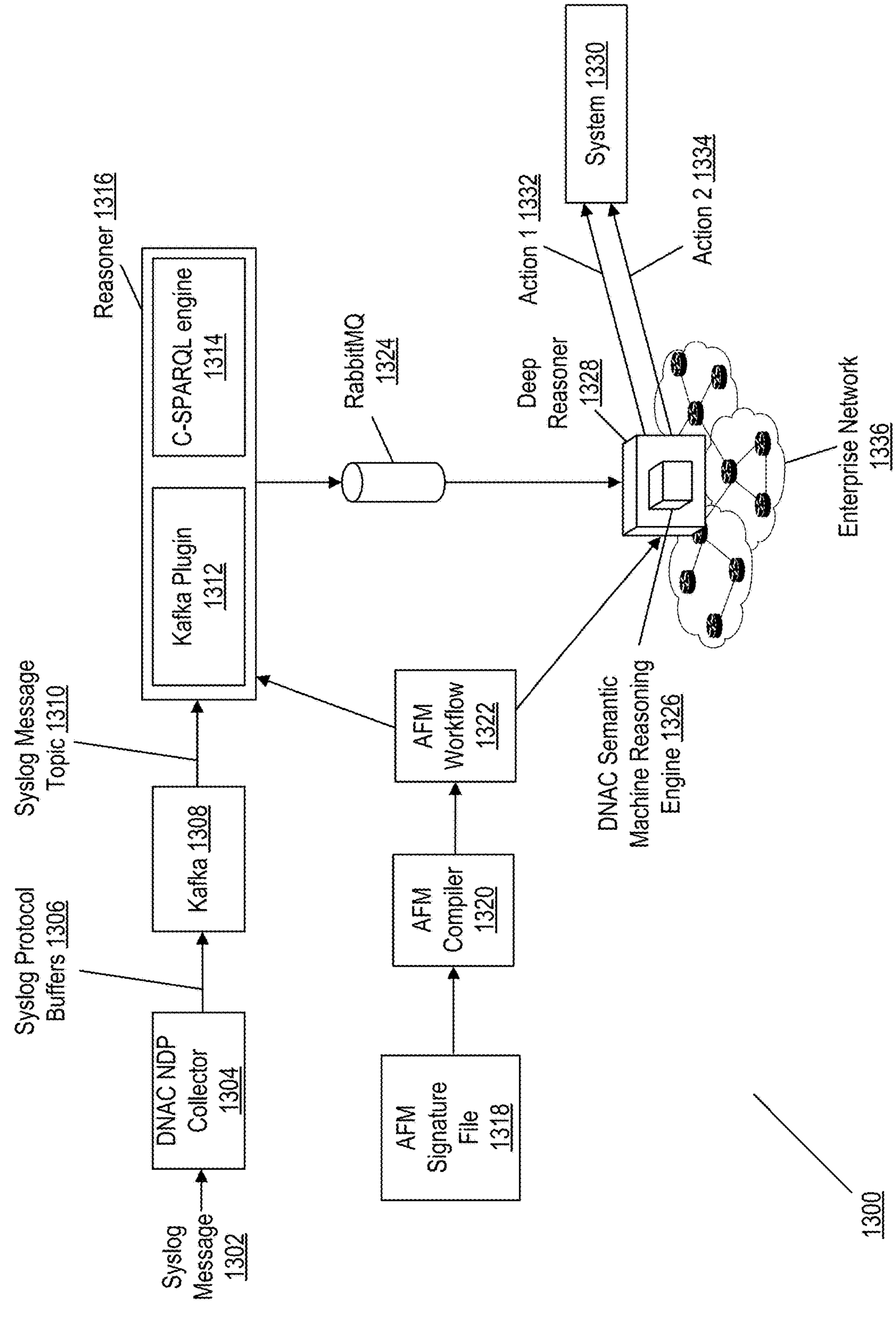
FIG. 13 illustrates an example integration of automatic fault management (AFM) signature support on a network controller, in accordance with various aspects of the subject technology.

FIG. 13 illustrates an example integration 1300 of automatic fault management (AFM) signature support on a network controller such as CISCO TECHNOLOGIES DNAC, in accordance with various aspects of the subject technology.

In FIG. 13, DNAC network data platform (NDP) collector 1304 receives syslog message 1302. In some embodiments, syslog message 1302 represents a message that is formatted according to syslog. Syslog is a protocol that allows a machine to send event notification messages across IP networks to event message collectors. In other words, a machine or device can be configured in such a way that it generates syslog messages and forwards them to a specific syslog daemon.

In FIG. 13, DNAC NDP collector 1304 generates syslog protocol buffers 1306 based on syslog message 1302. Syslog protocol buffer 1306 is a transformed version of syslog message 1302 based on a method of serializing structured data. Kafka 1308 receives syslog protocol buffers 1306 and generates syslog message topic 1310. Kafka 1308 is a distributed messaging system that is partitioned and replicated. Kafka 1308 uses the concept of topics. Topics are feeds of messages in specific categories.

In FIG. 13, syslog message topic 1310 is fed into reasoner 1316. Reasoner 1316 comprises Kafka plugin 1312 and C-SPARQL engine 1314. Kafka plugin 1312 is a software add-on that that is capable of receiving and interpreting messages created using Kafka 1308. C-SPARQL engine 1314 represents a continuous SPARQL protocol and resource description framework (RDF) query language (C-SPARQL) engine.

In FIG. 13, messages sent by reasoner 1316 first go through RabbitMQ 1324 before reaching deep reasoner 1328. RabbitMQ 1324 is an open source message broker software that implements an advanced message queuing protocol (AMQP) standard. The AMQP is an open standard for passing business messages between applications or organizations.

In some embodiments, the messages received by reasoner 1316 may be directed to DNAC semantic machine reasoning engine 1326 of deep reasoner 1328. Deep reasoner 1328 can be a part of enterprise network 1336.

In FIG. 13, automatic fault management (AFM) signature file 1318 represents a signature file that is provided by an expert (not shown in FIG. 13). The signature file represents sets of rules developed by the expert, based on deep expert knowledge. The expert can be an engineer or a person who has profound network knowledge. In some embodiments, the expert is similar to CX engineer 1202 in FIG. 12.

In some embodiments, automatic fault management (AFM) compiler 1320 compiles AFM signature file 1318 into AFM workflow 1322. In some embodiments, the sets of rules within AFM signature file 1318 are compiled into ontologies in AFM workflow 1322 via AFM compiler 120. AFM compiler 1320 automatically translates the set of rules within AFM signature file 1318 into AFM workflow 1322. AFM compiler 1320 does the translation without the need for new code. AFM workflow 1322 is transferred to deep reasoner 1328.

In some embodiments, DNAC semantic machine reasoning engine 1326 is a part of enterprise network 1336. In some embodiments, DNAC semantic machine reasoning engine 1326 represents a semantic machine reasoning engine embedded within a DNAC of enterprise network 1336.

In some embodiments, after detecting an issue in enterprise network 1336, DNAC semantic machine reasoning engine 1326 may go through the ontologies, syslog message 1302, or a transformed version of syslog message 1302, received from RabbitMQ 1324, to find a potential solution for the issue. If a solution is found for the issue, DNAC semantic machine reasoning engine 1326 may collected additional information, if needed. Further, DNAC semantic machine reasoning engine may perform additional checks to identify the main cause of the issue.

In some embodiments, DNAC semantic machine reasoning engine 1326 may perform action 1332 and action 2 1334. In some embodiments, action 1 1332 represents opening a service ticket in system 1330. In some embodiments, action 2 1334 represents suggesting a remedial action to system 1330. In some embodiments, system 1330 may represent an IT service management (ITSM) system.

In some embodiments, DNAC semantic machine reasoning engine 1326 may notify a customer of enterprise network 1336 after opening the service ticket in system 1330. If the customer approves the suggested remedial action, then DNAC semantic machine reasoning engine 1326 automatically implements the remedial action and fixes the issue. In some embodiments, the customer may not be involved in the approval of the suggested remedial action in enterprise network 1336. In such cases, per request of the customer, provider of enterprise network 1336 is completely responsible for managing enterprise network 1336. Therefore, managing enterprise network 1336 can be done automatically with minimal to no human intervention.

Figure 14A:
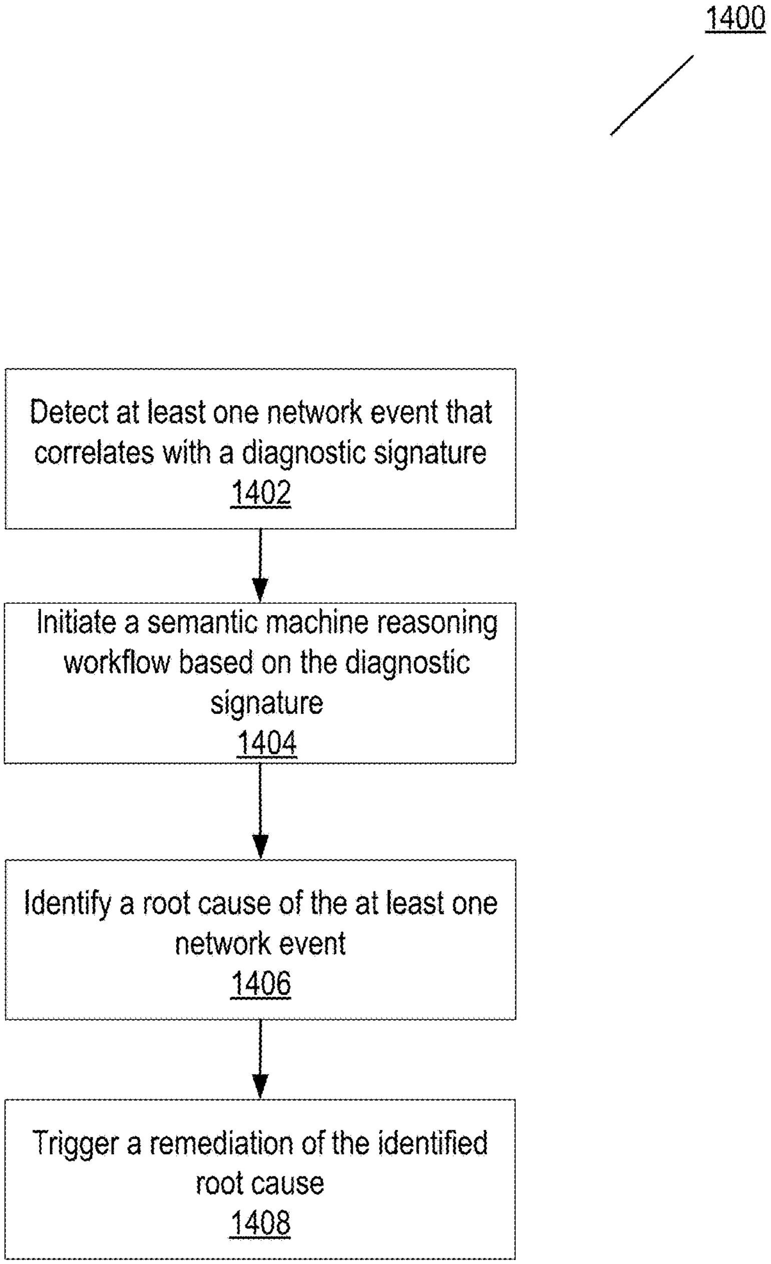
FIGS. 14A and 14B illustrate example method embodiments for detecting an issue and taking a remedial action to fix the issue, in accordance with some embodiments of the present technology.

FIG. 14A illustrates method embodiment 1400 for detecting an issue and taking a remedial action to fix the issue, in accordance with some embodiments of the present technology. Steps and processes outlined herein are non-limiting examples provided for illustration purposes, and can be implemented in any combination thereof, including combinations that exclude, add, or modify certain steps. In some aspects, method 1400 and its associated steps and processes may be performed by a system. The system is an example of a computing system, which can be a desktop computer, a laptop, a tablet, a mobile computing device, or generally any computing system, having at least one processor, capable of performing method 1400.

In FIG. 14A and at operation 1402, the system initiates a process, wherein the system detects at least one network event that correlates with a diagnostic signature. The diagnostic signature defines a possible network condition that is indicated by the presence of at least one network event. In some embodiments, the at least one network event is similar to the detected issue in enterprise network 1228 described previously with respect to FIG. 12. In some embodiments, the diagnostic signature, which is a form of knowledge, can be similar to contents of AFM signatures 1206, TAC cases 1208, or CX intellectual capital 1210, described in FIG. 12. In some embodiments, the diagnostic signature may have been recorded previously by a subject matter expert. The subject matter expert can be similar to CX engineer 1202 in FIG. 12. In some embodiments, the subject matter expert is a person with profound knowledge in network applications. At operation 1402, the system finds a correlation between the at least one network event and the diagnostic signature recorded previously. In some embodiments, the correlation may be a similarity between the at least one network event and an issue, faced previously, that has been recorded in the diagnostic signature.

At operation 1404, the system initiates a semantic machine reasoning workflow based on the diagnostic signature. In some embodiments, the semantic machine reasoning workflow can be similar to a workflow created in flowchart GUI 108 in FIG. 1. The diagnostic signature is linked to the workflow. In some embodiments, the diagnostic signature may require creating and running the workflow.

At operation 1406, the system identifies a root cause of the at least one network event. Identification of the root cause of the at least one network event may be based upon initiating the semantic machine reasoning engine.

At operation 1408, the system triggers a remediation of the identified root cause. In some embodiments, triggering the remediation of the identified root cause is similar to action 1 1332 and action 2 1334 in FIG. 13. As described previously with respect to FIG. 13, action 1 1332 and action 2 1334 represent opening a service ticket in system 1330 and suggesting a remedial action to system 1330, respectively.

In some embodiments, the semantic machine reasoning workflow at operation 1404 is represented in one or more ontology web language (OWL) files that includes rules for carrying out the semantic machine reasoning workflow. The one or more OWL files can be similar to OWL file 300 in FIG. 3. Further, the rules in the one or more OWL files can be similar to rules 306 in FIG. 3. In some embodiments, the one or more OWL files are compiled from structured data, defining at least a condition, a root cause determination logic, and an action. The root cause determination logic defines rules for carrying out at least a portion of the semantic machine reasoning engine.

Figure 14B:
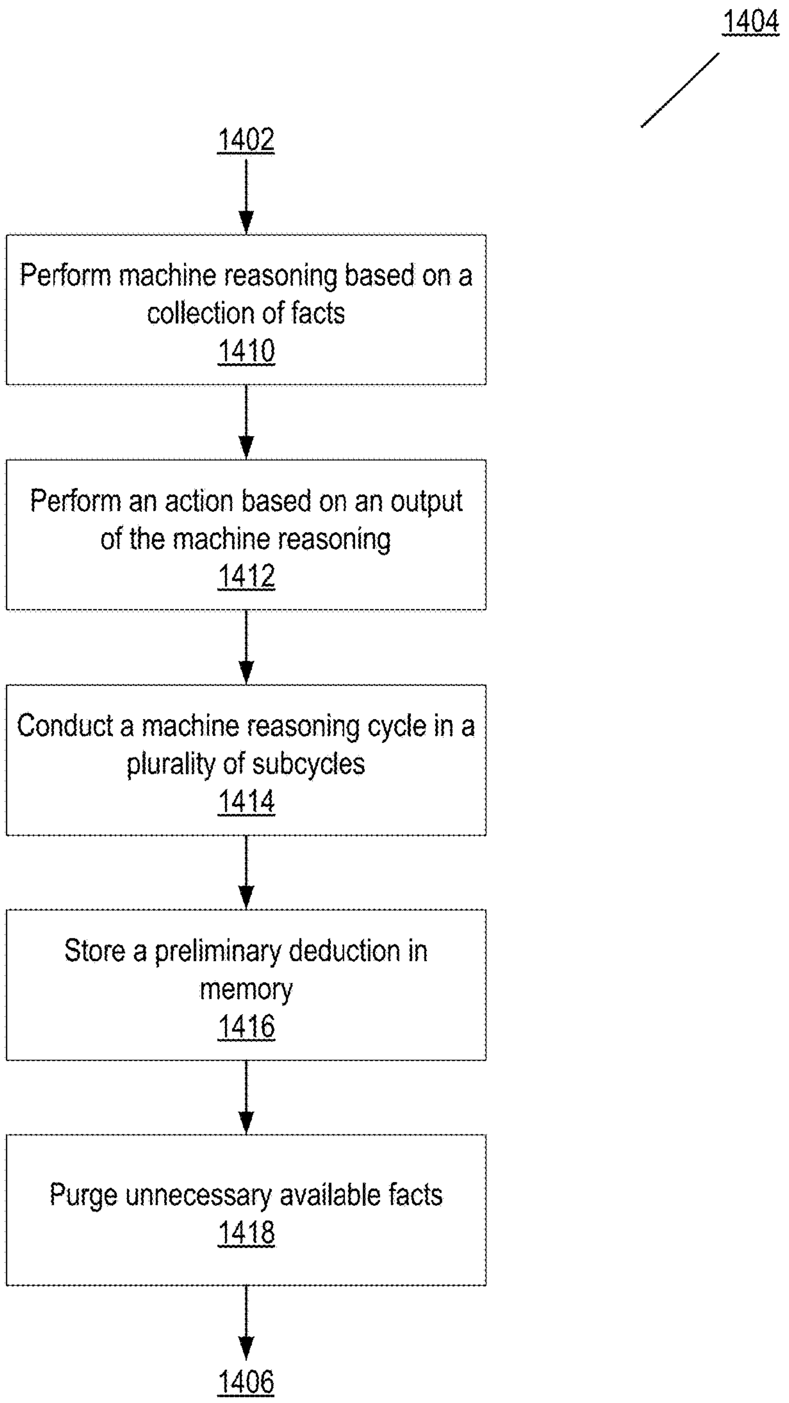

FIG. 14B illustrates steps involved in operation 1404 of method 1400 in FIG. 14A, in accordance with some embodiments of the subject technology. At operation 1410, the system performs machine reasoning based on a collection of facts. In some embodiments, the collection of facts is included in a series of machine reasoning cycles. The semantic machine reasoning workflow is characterized by the series of machine reasoning cycles. The series of machine reasoning cycles and the collection of facts are similar to what was described previously with respect to FIG. 5 or FIG. 10, for example.

At operation 1412, the system performs an action based on an output of the machine reasoning. In some embodiments, the action can include propagating knowledge to a subsequent cycle in the series of machine reasoning cycles or the remediation. In some embodiments, propagating knowledge to the subsequent cycle in the series of machine reasoning cycles can be similar to directing retained facts 1 1012A to cycle 2 1002B in FIG. 10.

At operation 1414, the system conducts a machine reasoning cycle in a plurality of subcycles. The plurality of subcycles can be similar to pages 1, 2, . . . , N 1106 in FIG. 11. In some embodiments, each subcycle in the plurality of subcycles performs actions defined by the machine reasoning cycle on a subset of the available facts.

At operation 1416, the system stores a preliminary deduction in memory. At operation 1418, the system purges unnecessary available facts. The subset of available facts can be similar to retained facts 1 1012A from cycle 1 1002A that is transferred to cycle 2 1002B in FIG. 10. Purging unnecessary available facts can be similar to purging irrelevant facts 1010A in FIG. 10 or purging irrelevant facts 512 in FIG. 5.

While reference has been made herein to a semantic machine reasoning workflow, or process, it will be understood that actions or analysis carried out by the present technology can also be broken into smaller workflows that are chained together. The use of the singular form of the words workflow or process is not to be an arbitrary limitation on the construction of the workflow or process.

While several embodiments herein have been described with respect to CISCO TECHNOLOGIES enterprise network controller DNAC (DIGITAL NETWORK ARCHITECTURE CONTROLLER), it will be appreciated by those of ordinary skill in the art that such descriptions are by way of example, and that the present technology is not limited to use with DNAC. The present technology can be used to varying levels of functionality in networks with and without network controllers from any provider.

Figure 15:
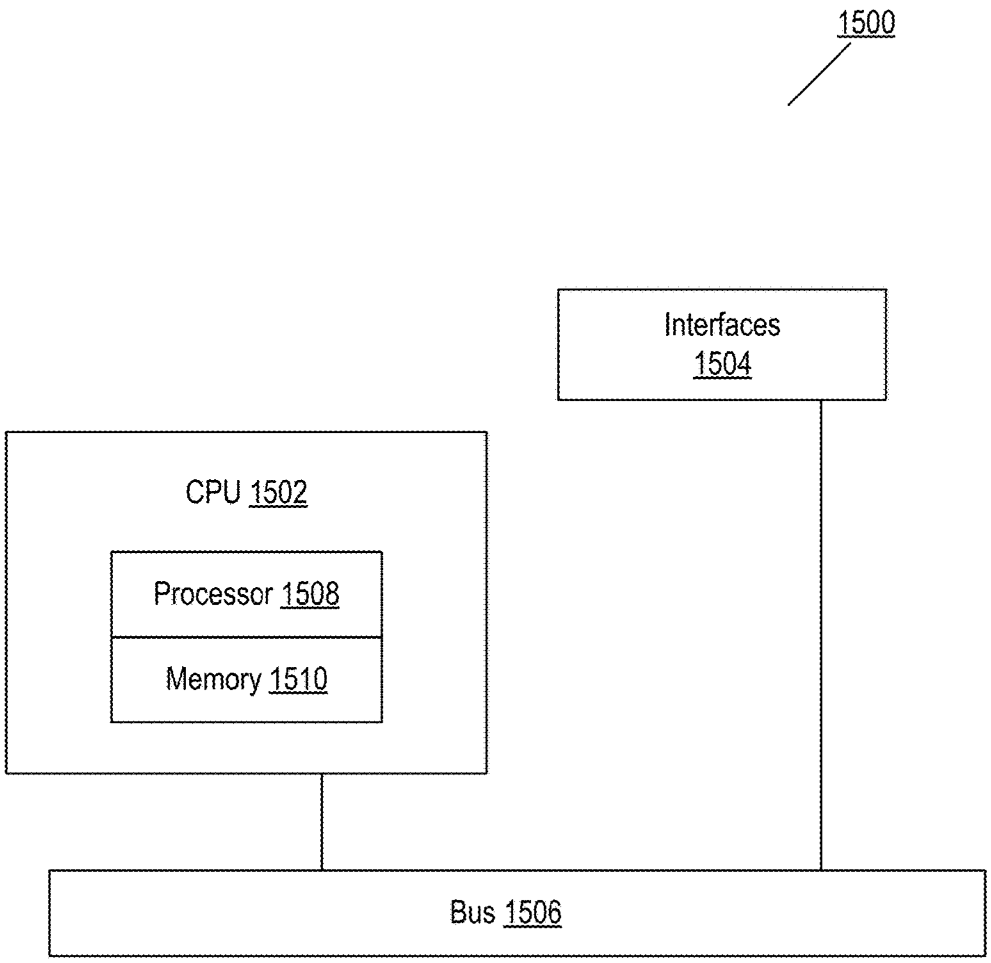
FIG. 15 illustrates an example embodiment of a networking device in accordance with some aspects of the present technology.

FIG. 15 illustrates an example network device 1500 (e.g., switch, router, network appliance, etc.). Network device 1500 can include a master central processing unit (CPU) 1502, interfaces 1504, and a bus 1506 (e.g., a PCI bus). When acting under the control of appropriate software or firmware, CPU 1502 can be responsible for executing packet management, error detection, and/or routing functions. CPU 1502 preferably accomplishes all these functions under the control of software including an operating system and any appropriate applications software. CPU 1502 may include one or more processors 1508 such as a processor from the Motorola family of microprocessors or the MIPS family of microprocessors. In an alternative embodiment, processor 1508 can be specially designed hardware for controlling the operations of network device 1500. In an embodiment, a memory 1510 (such as non-volatile RAM and/or ROM) can also form part of CPU 1502. However, there are many different ways in which memory could be coupled to the system.

Interfaces 1504 can be provided as interface cards (sometimes referred to as line cards). Generally, they control the sending and receiving of data packets over the network and sometimes support other peripherals used with network device 1500. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 1504 may include ports appropriate for communication with the appropriate media. In some cases, interfaces 1504 may also include an independent processor and, in some instances, volatile RAM. The independent processors may control communication intensive tasks such as packet switching, media control, and management. By providing separate processors for the communication intensive tasks, interfaces 1504 may allow CPU 1502 to efficiently perform routing computations, network diagnostics, security functions, and so forth.

Although the system shown in FIG. 15 is one specific network device of the present disclosure, it is by no means the only network device architecture on which the subject technology can be implemented. For example, an architecture having a single processor that can handle communications as well as routing computations and other network functions, can also be used. Further, other types of interfaces and media may also be used with network device 1500.

Regardless of the network device's configuration, it may employ one or more memories or memory modules (including memory 1510) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Network device 1500 can also include an application-specific integrated circuit (ASIC), which can be configured to perform routing and/or switching operations. The ASIC can communicate with other components in network device 1500 via bus 1506, to exchange data and signals and coordinate various types of operations by network device 1500, such as routing, switching, and/or data storage operations, for example.

Figure 16:
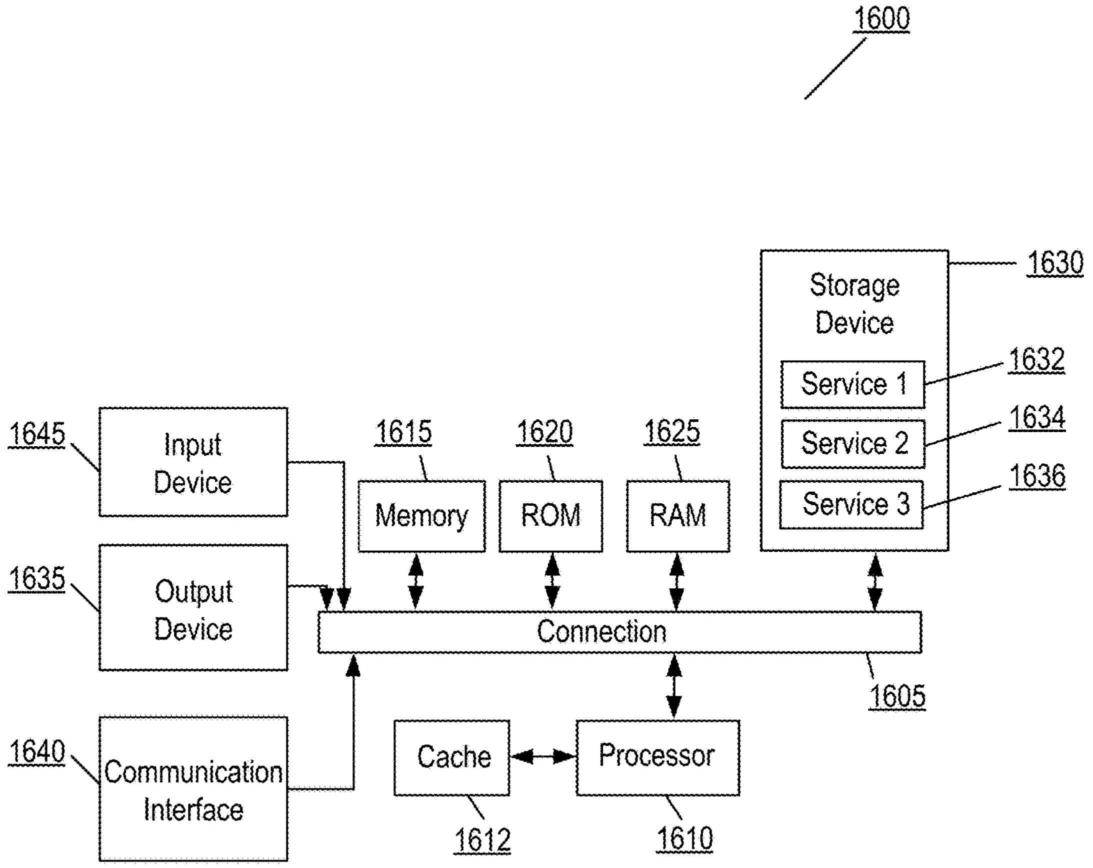
FIG. 16 illustrates an example embodiment of a computing system in accordance with some aspects of the present technology.

FIG. 16 shows an example of computing system architecture 1600, which can be for example any computing device making up a controller, or a wireless access point or any component thereof in which the components of the system are in communication with each other using connection 1605. Connection 1605 can be a physical connection via a bus, or a direct connection into processor 1610, such as in a chipset architecture. Connection 1605 can also be a virtual connection, networked connection, or logical connection.

In some embodiments computing system 1600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read only memory (ROM) 1620 and random access memory (RAM) 1625 to processor 1610. Computing system 1600 can include a cache of high-speed memory 1612 connected directly with, in close proximity to, or integrated as part of processor 1610.

Processor 1610 can include any general purpose processor and a hardware service or a software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms known to those of skill in the art. In some instances, multimodal systems can enable a user to provide multiple types of input/output to communicate with computing system 1600. Computing system 1600 can include communications interface 1640, which can generally govern and manage the user input and system output. There is no restriction on operating on any particular hardware arrangement and therefore the basic features here may easily be substituted for improved hardware or firmware arrangements as they are developed.

Storage device 1630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

Storage device 1630 can include software services, servers, services, etc., that when the code that defines such software is executed by processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:

creating a diagnostic signature, wherein the diagnostic signature defines a network condition of a network and a remedy for the network condition;

detecting a network event;

determining the network event is similar to the network condition of the previously created diagnostic signature;

initiating a semantic machine reasoning workflow based on the diagnostic signature to identify a root cause of the network event; and triggering by the semantic machine reasoning workflow a remediation of the identified root cause.

2. The method of claim 1, wherein the diagnostic signature is linked to the workflow.

3. The method of claim 1, wherein the semantic machine reasoning workflow is characterized by a series of machine reasoning cycles that include a collection of facts, performing machine reasoning based on the collection of facts, and performing an action based on an output of the machine reasoning, wherein the action can include propagating knowledge to a subsequent cycle in the series of machine reasoning cycles or the remediation.

4. The method of claim 3, comprising: within a machine reasoning cycle from the series of machine reasoning cycles, conducting the machine reasoning cycle in a plurality of subcycles, wherein each subcycle performs actions defined by the machine reasoning cycle on a subset of the collection of facts, and storing a preliminary deduction in memory and purging unnecessary facts from the collection of facts.

5. The method of claim 1, wherein the semantic machine reasoning workflow is represented in one or more ontology web language (OWL) files that includes rules for carrying out the semantic machine reasoning workflow.

6. The method of claim 5, wherein the one or more OWL files are compiled from structured data defining at least a condition, a root cause determination logic, and an action.

7. The method of claim 6, wherein the root cause determination logic defines rules for carrying out at least a portion of the semantic machine reasoning workflow.

8. A non-transitory computer readable medium comprising instructions stored thereon, the instructions effective to cause at least one processor to:

create a diagnostic signature, wherein the diagnostic signature defines a network condition of a network and a remedy for the network condition;

detect a network event;

determine the network event is similar to the network condition of the previously created diagnostic signature;

initiate a semantic machine reasoning workflow based on the diagnostic signature to identify a root cause of the network event; and trigger a remediation of the identified root cause.

9. The non-transitory computer readable medium of claim 8, wherein the diagnostic signature is linked to the workflow.

10. The non-transitory computer readable medium of claim 8, wherein the semantic machine reasoning workflow is characterized by a series of machine reasoning cycles that include a collection of facts, performing machine reasoning based on the collection of facts, and performing an action based on an output of the machine reasoning, wherein the action can include propagating knowledge to a subsequent cycle in the series of machine reasoning cycles or the remediation.

11. The non-transitory computer readable medium of claim 10, comprising: within a machine reasoning cycle from the series of machine reasoning cycles, conducts the machine reasoning cycle in a plurality of subcycles, wherein each subcycle performs actions defined by the machine reasoning cycle on a subset of the collection of facts, and storing a preliminary deduction in memory and purging unnecessary facts from the collection of facts.

12. The non-transitory computer readable medium of claim 8, wherein the semantic machine reasoning workflow is represented in one or more ontology web language (OWL) files that includes rules for carrying out the semantic machine reasoning workflow.

13. The non-transitory computer readable medium of claim 12, wherein the one or more OWL files are compiled from structured data defining at least a condition, a root cause determination logic, and an action.

14. The non-transitory computer readable medium of claim 13, the root cause determination logic defines rules for carrying out at least a portion of the semantic machine reasoning workflow.

15. A system comprising:

at least one non-transitory computer readable medium storing instructions thereon; and at least one processor to execute the instructions to cause the system to:

create a diagnostic signature, wherein the diagnostic signature defines a network condition of a network and a remedy for the network condition;

detect a network event;

determine the network event is similar to the network condition of the previously created diagnostic signature;

initiate a semantic machine reasoning workflow based on the diagnostic signature to identify a root cause of the at least one network event; and trigger a remediation of the identified root cause.

16. The system of claim 15, wherein the diagnostic signature is linked to the workflow.

17. The system of claim 15, wherein the semantic machine reasoning workflow is characterized by a series of machine reasoning cycles that include a collection of facts, performing machine reasoning based on the collection of facts, and performing an action based on an output of the machine reasoning, wherein the action can include propagating knowledge to a subsequent cycle in the series of machine reasoning cycles or the remediation.

18. The system of claim 17, comprising: within a machine reasoning cycle from the series of machine reasoning cycles, conducts the machine reasoning cycle in a plurality of subcycles, wherein each subcycle performs actions defined by the machine reasoning cycle on a subset of the collection of facts, and storing a preliminary deduction in memory and purging unnecessary facts from the collection of facts.

19. The system of claim 15, wherein the semantic machine reasoning workflow is represented in one or more ontology web language (OWL) files that includes rules for carrying out the semantic machine reasoning workflow.

20. The system of claim 19, the one or more OWL files are compiled from structured data defining at least a condition, a root cause determination logic, and an action.

* * * * *